US009444571B2

(12) United States Patent
Sumasu et al.

(10) Patent No.: US 9,444,571 B2
(45) Date of Patent: Sep. 13, 2016

(54) CONTROL INFORMATION TRANSMISSION APPARATUS, CONTROL INFORMATION RECEPTION APPARATUS, AND CONTROL INFORMATION TRANSMISSION METHOD

(75) Inventors: Atsushi Sumasu, Kanagawa (JP); Akihiko Nishio, Kanagawa (JP); Ayako Horiuchi, Kanagawa (JP); Masayuki Hoshino, Kanagawa (JP); Yoshihiko Ogawa, Kanagawa (JP); Takashi Iwai, Ishikawa (JP); Shinsuke Takaoka, Kanagawa (JP); Daichi Imamura, Kanagawa (JP); Seigo Nakao, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 79 days.

(21) Appl. No.: 13/575,466

(22) PCT Filed: Jan. 28, 2011

(86) PCT No.: PCT/JP2011/000478
§ 371 (c)(1),
(2), (4) Date: Jul. 26, 2012

(87) PCT Pub. No.: WO2011/093093
PCT Pub. Date: Aug. 4, 2011

(65) Prior Publication Data
US 2012/0320854 A1 Dec. 20, 2012

(30) Foreign Application Priority Data
Jan. 28, 2010 (JP) ................................ 2010-017113

(51) Int. Cl.
*H04W 4/00* (2009.01)
*H04W 28/26* (2009.01)
(Continued)

(52) U.S. Cl.
CPC ............ *H04J 11/0056* (2013.01); *H04L 5/001* (2013.01); *H04L 5/0053* (2013.01); *H04L 5/0073* (2013.01); *H04L 27/2626* (2013.01); *H04W 84/045* (2013.01)

(58) Field of Classification Search
CPC ..... H04J 11/0056; H04J 11/56; H04L 5/001; H04L 5/0073; H04L 5/0096; H04L 5/0053; H04L 5/0094; H04L 27/2626; H04W 84/45
USPC ................ 370/329, 328, 252, 496; 375/260; 455/450
See application file for complete search history.

(56) References Cited

U.S. PATENT DOCUMENTS

2009/0268831 A1* 10/2009 Onggosanusi et al. ....... 375/260
2010/0208679 A1* 8/2010 Papasakellariou et al. .. 370/329
(Continued)

OTHER PUBLICATIONS

Motorola, Extension carrier operation, 3GPP TSG RAN WG2 Meeting #6 R2-096875, 3GPP, Nov. 9, 2009.
(Continued)

*Primary Examiner* — Alpus H Hsu
*Assistant Examiner* — Camquyen Thai
(74) *Attorney, Agent, or Firm* — Pearne & Gordon LLP

(57) ABSTRACT

A control information transmission apparatus which can reduce the interference power of the control signal of the terminal connected to the femtocell is provided. The control information transmission apparatus comprises an arrangement unit that arranges some or all of control signals for a terminal in an extension part among resources including a compatible part and the extension part; and a transmission unit that transmits some or all of the arranged control signals for the terminal.

9 Claims, 25 Drawing Sheets

(51) Int. Cl.
  *H04J 1/00* (2006.01)
  *H04W 72/04* (2009.01)
  *H04J 11/00* (2006.01)
  *H04L 5/00* (2006.01)
  *H04L 27/26* (2006.01)
  *H04W 84/04* (2009.01)

(56) References Cited

U.S. PATENT DOCUMENTS

2011/0103243 A1* 5/2011 Larsson ............... H04L 5/001 370/329
2011/0149894 A1* 6/2011 Luo et al. ..................... 370/329
2011/0170496 A1* 7/2011 Fong et al. .................. 370/329
2011/0274066 A1* 11/2011 Tee et al. ..................... 370/329
2012/0008585 A1* 1/2012 Kwon et al. .................. 370/329
2012/0014330 A1* 1/2012 Damnjanovic et al. ...... 370/329

OTHER PUBLICATIONS

NTT Docomo, Comparison of Carrier Segment and Extension Carrier for Contiguous Carrier Aggregation, 3GPP R1-100491, 3GPP, Jan. 18, 2010.
NTT Docomo, Inc., Non-accessible carriers in LTE-A, 3GPP TSG RAN #68R2-096976, 3GPP, Nov. 9, 2009, Jeju, South Korea.
3GPP TR 36.814 v.1.5.0, Nov. 2009, Physical Layer Aspects (Release 9).
3GPP TSG RAN WG1 #59, R1-094569 "PDCCH Extension to Support Operation with CI" Jeju, Korea, Nov. 9-13, 2009.
International Search Report for PCT/JP2011/000478 dated Mar. 15, 2011.

* cited by examiner

| Case | Environment | Deployment Scenario | Non-traditional node |
|---|---|---|---|
| 5.1 | Macro + Indoor | Macro + femtocell | femtocell |
| 5.2 | | Macro + indoor relay | Indoor relay |
| 5.3 | | Macro + indoor RRH/Hotzone | e.g. indoor pico |
| 6.1 | Macro + Outdoor | Macro + outdoor relay | Outdoor relay |
| 6.2 | | Macro + outdoor RRH/Hotzone | e.g., outdoor pico |

CONTROL INFORMATION TRANSMISSION APPARATUS, CONTROL INFORMATION RECEPTION APPARATUS, AND CONTROL INFORMATION TRANSMISSION METHOD

TECHNICAL FIELD

The present invention relates to a control information transmission apparatus, a control information reception apparatus, and a control information transmission method, and more particularly, to a control information transmission apparatus, a control information reception apparatus, and a control information transmission method for control signal communication in a heterogeneous network (HetNet).

BACKGROUND ART

In recent years, ITU-R (International Telecommunication Union-Radiocommunication sector) has enrolled the IMT (International Mobile Telecommunication)-Advanced system. In 3GPP (3rd Generation Partnership Project), LTE-Advanced (hereinafter, referred to as LTE-A) capable of improving the system performance while maintaining compatibility with Rel.8 LTE (Release 8 Long Term Evolution) has been standardized. It is not easy for the macro cell system which is the base of the cellular system and in which cells around the base station cover the service areas to satisfy capacity and coverage required in the future.

The heterogeneous network (hereinafter, also referred to as HetNet) in which a low-power local node is arranged in the cells of the macro cell system has been examined for LTE-A (see Non Patent Literature 1). FIG. 22 is a diagram illustrating an example of a HetNet scenario. As shown in FIG. 22, five cases have been examined as the HetNet scenario. One of the five cases is the mixture of a macro cell and a femtocell (see Case 5.1). FIG. 23 shows an example of the HetNet. A femtocell (Home eNB: HeNB) is disposed in the vicinity of the macro cell (evolved Node B: eNB). As shown in FIG. 23, a terminal (user equipment connected to Macro eNB: MUE in FIG. 23) in area 1 is connected to the macro cell (Macro eNB) and a terminal (user equipment connected to Home eNB: HUE in FIG. 23) in area 2 is connected to the femtocell (in FIG. 23, HeNB). Area 1 covered by the macro cell (Macro eNB) is larger than area 2 covered by the femtocell.

In LTE-A, a carrier aggregation simultaneously using a plurality of component carriers (hereinafter, also referred to as CCs) has been examined. When a plurality of CCs are adjacent to each other, an extension carrier or a carrier segment for effectively using the frequency band between the CCs has been examined.

FIG. 24 is a schematic diagram illustrating the extension carrier. In FIG. 24, the vertical axis indicates time and the horizontal axis indicates a frequency. In FIG. 24, for distinguishing a plurality of CCs, the carrier components are represented by CC1 and CC2, and the extension carrier or the carrier segment is simply represented as an extension carrier part. In FIG. 24, an RB (Resource Block) is a resource unit including 12 sub-carriers of one sub-frame in LTE or LTE-A. Each CC shown in FIG. 24 is one sub-frame unit.

When each CC is used, a guard band (GB) is provided in order to reduce interference with an adjacent system band. However, when a plurality of adjacent carrier components CC1 and CC2 are used in the same LTE-A, it is possible to reduce the guard band GB between the carrier components CC1 and CC2. Therefore, as shown in FIG. 24, in order to effectively use the frequency band between the carrier components CC1 and CC2, the extension carrier or the carrier segment is added to the original band (Backward Compatible Part) defined in LTE. In FIG. 24, the backward compatible part is 100 RBs and the extension carrier part is 10 RBs for each CC.

The extension carrier and the carrier segment are similar to each other in that RB (Resource Block) is physically added to the original CC (CC defined in LTE; hereinafter, also referred to as the backward compatible part). However, the extension carrier differs from the carrier segment in that it is treated as a CC different from the original CC and the carrier segment is treated as resources associated with the original CC (see Non Patent Literature 2).

CITATION LIST

Non Patent Literature

[NPL 1] 3GPP TR 36.814
[NPL 2] 3GPP R1-100491 "Comparison of Carrier Segment and Extension Carrier for Contiguous Carrier Aggregation"
[NPL 3] 3GPP R1-094569 "PDCCH Extension to Support Operation with CI"

SUMMARY OF INVENTION

Technical Problem

However, the reception quality of a downlink control signal PDCCH (Physical Downlink Control Channel) by the terminal (HUE) connected to the femtocell (HeNB) in the macro cell is low. This will be described with reference to FIG. 25. FIG. 25 is a diagram illustrating another example of the HetNet.

First, in LTE, PDCCH (Physical Downlink Control Channel) is time-multiplexed at the head of a sub-frame and is transmitted. When the sub-frames of each base station (eNB) are synchronized with each other, the base stations (Macro eNB) transmit the PDCCHs at the same time. The HeNB is a small base station for the home user, and it is assumed that only the registered home terminal is connected to the HeNB. The transmission power of the HeNB is set to be less than that of the macro cell base station (Macro eNB).

Therefore, as shown in FIG. 25, when the HeNB is arranged in the vicinity of the macro cell (Macro eNB), the power of the signal transmitted from the macro cell (Macro eNB) to the MUE connected to the macro cell (Macro eNB) is more than that of the signal transmitted from the HeNB to the HUE connected to the HeNB. As a result, the signal transmitted from the HeNB to the HUE receives large interference from the signal transmitted from the macro cell (Macro eNB) to the MUE. In other words, the signal transmitted from the macro cell (Macro eNB) to the MUE interferes with the signal transmitted from the HeNB to the HUE. In particular, when the HUE cannot receive, demodulate, and decode the PDCCH which carries control information required for communication due to the interference, it cannot communicate with the HeNB.

For example, as one of the purposes for reducing the interference between the cells in the HetNet, Non patent Literature 3 discloses a method which extends the PDCCH to a PDSCH (Physical Downlink Shared Channel) region.

An object of the invention is to provide a control information transmission apparatus that transmits control signals for an LTE-A terminal (UE) using an extension part (Extension Carrier or Carrier Segment), which is a portion of the resources, in a HetNet environment, thereby reducing the amount of resources used in a control signal region for an LTE-A terminal (UE) in the compatible part, which is a portion of the resources and reducing the interference power of the control signal of a terminal connected to a femtocell.

Another object of the invention is to provide a control information reception apparatus that receives a control signal arranged in an extension part (Extension Carrier or Carrier Segment), which is a portion of the resources, in a HetNet environment, thereby reducing interference from a femtocell to the control signal arranged in the extension part (Extension Carrier or Carrier Segment) and reliably receiving the control signal for the control information reception apparatus.

Solution to Problem

A control information transmission apparatus of the present invention includes: an arrangement unit that arranges some or all of control signals for a terminal in an extension part among resources including a compatible part and the extension part; and a transmission unit that transmits some or all of the arranged control signals for the terminal.

In the control information transmission apparatus, the compatible part is a system band used by a plurality of systems which need to retain compatibility, and the extension part is a frequency resource that is provided in a frequency band adjacent to the compatible part and is capable of allocating a transmission signal.

In the control information transmission apparatus, the arrangement unit arranges some or all of the control signals for the terminal in the extension part and the compatible part among the resources, and the transmission unit transmits some or all of the arranged control signals for the terminal.

In the control information transmission apparatus, the arrangement unit arranges all of the control signals for the terminal in an extension part obtained by logically integrating a plurality of extension parts.

In the control information transmission apparatus, the arrangement unit arranges all of the control signals for the terminal in an extension part obtained by logically integrating a plurality of extension parts laid across the compatible part, among the plurality of extension parts.

In the control information transmission apparatus, the arrangement unit forms predetermined units of the resources for the control signals and defines numbers which are consecutive from the compatible part to the extension part and are allocated to the predetermined units of the resources, the arrangement unit makes a plurality of units of the predetermined unit of the compatible part correspond to one unit or a plurality of units of the predetermined unit of the extension part on the basis of the numbers, and when some or all of the control signals for the terminal are arranged in one unit or a plurality of units among the plurality of units of the predetermined unit of the compatible part and one unit or a plurality of units of the predetermined unit of the extension part, some or all of the control signals for the terminal are not arranged in the other units among the plurality of units of the predetermined unit of the compatible part.

In the control information transmission apparatus, the predetermined unit of the resources for the control signal is a CCE, and the numbers which are consecutive from the compatible part to the extension part and are allocated to the predetermined units of the resources are CCE numbers.

A control information reception apparatus of the present invention comprises: a receiving unit that receives, from the control information transmission apparatus, some or all of control signals for the control information reception apparatus which are arranged in an extension part among resources including a compatible part and the extension part.

A control information transmission method of the present invention comprises: arranging some or all of control signals for a terminal in an extension part among resources including a compatible part and the extension part; and transmitting some or all of the arranged control signals for the terminal.

Advantageous Effects of Invention

The control information transmission apparatus according to this invention transmits control signals for an LTE-A terminal (UE) using an extension part (Extension Carrier or Carrier Segment), which is a portion of the resources, in a HetNet environment, thereby reducing the amount of resources used in a control signal region for an LTE-A terminal (UE) in the compatible part, which is a portion of the resources and reducing the interference power of the control signal of a terminal connected to a femtocell.

The control information reception apparatus according to this invention receives a control signal arranged in an extension part (Extension Carrier or Carrier Segment), which is a portion of the resources, in a HetNet environment, thereby reducing interference from a femtocell to the control signal arranged in the extension part (Extension Carrier or Carrier Segment) and reliably receiving the control signal for the control information reception apparatus.

BRIEF DESCRIPTION OF DRAWINGS

FIGS. 11A and 11B are diagrams illustrating method (1) of allocating the PDCCH arranged in a resource block.

FIG. 22 is a diagram illustrating an example of a HetNet scenario.

DESCRIPTION OF EMBODIMENTS

Hereinafter, embodiments of the invention will be described with reference to the accompanying drawings.

When an extension carrier or a carrier segment forming an extension part is used in a macro cell (Macro eNB), a control information transmission apparatus according to each embodiment of the invention transmits a PDCCH (Physical Downlink Control Channel) for a terminal (UE) corresponding to Rel.10 or Rel.11, which is LTE-A, using RBs (Resource Blocks) increased by the extension carrier or the carrier segment forming the extension part, thereby reducing CCEs (Control Channel Elements) used in a PDCCH region of a compatible part and reducing the interference power of the PDCCH of an HUE (Home User Equipment: hereinafter, referred to as HUE) connected to a femtocell (Home eNB: hereinafter, referred to as HeNB).

CCE is for the control signal and is a predetermined unit of the resource.

Figure 1:
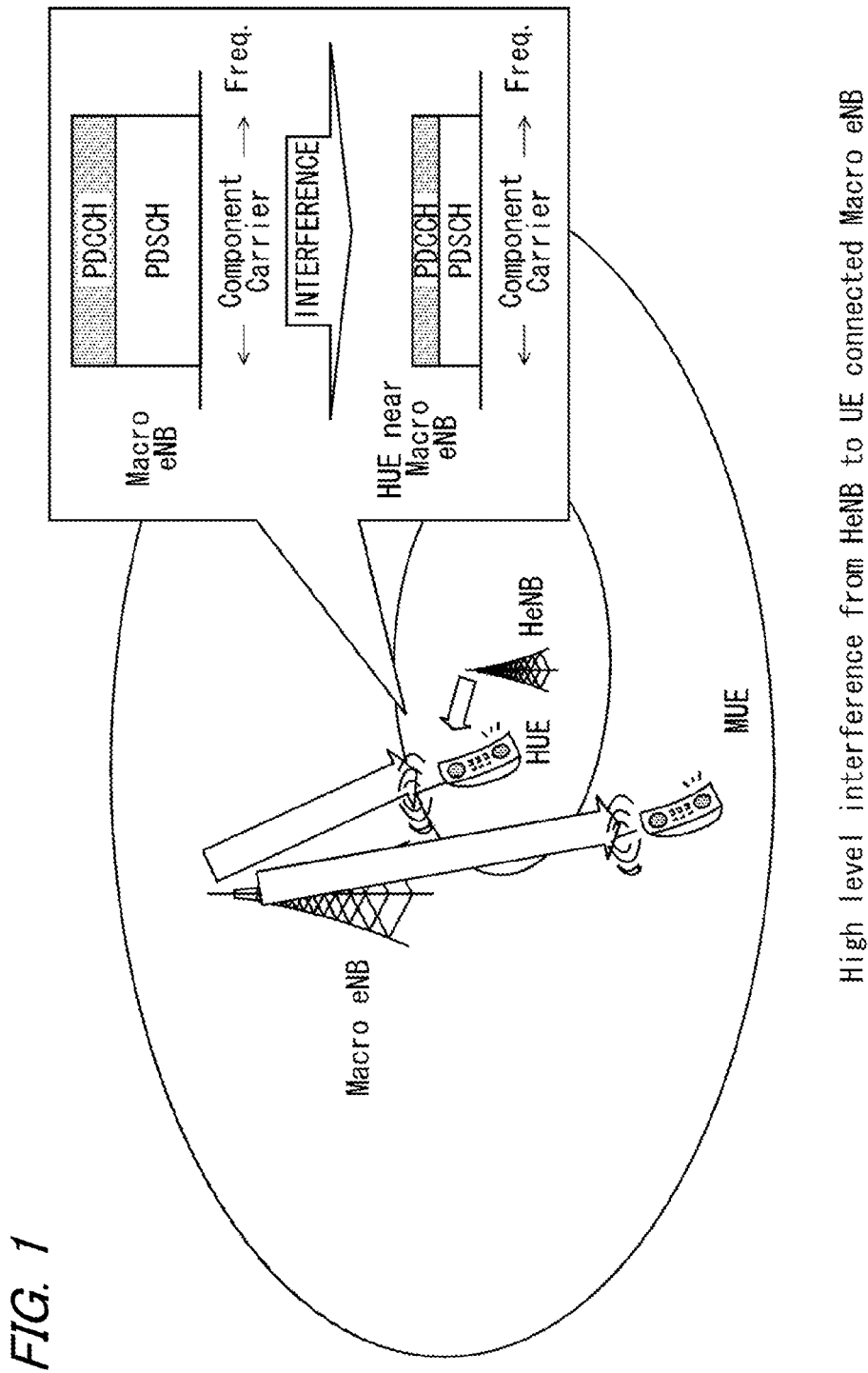
FIG. 1 is a conceptual diagram illustrating a HetNet environment in a first embodiment.

FIG. 1 is a conceptual diagram illustrating a HetNet environment in a first embodiment. In this embodiment, as shown in FIG. 1, a heterogeneous network (HetNet) is assumed in which a low-power local node is arranged in a cell of a macro cell system. As shown in FIG. 1, a HeNB is provided in the vicinity of a macro cell (Macro eNB) and the power of a signal transmitted from the macro cell (Macro eNB) to an MUE which is connected to the macro cell (Macro eNB) is more than the power of a signal transmitted from the HeNB to an HUE which is connected to the HeNB. As a result, in the HetNet environment shown in FIG. 1, the signal transmitted from the HeNB to the HUE is likely to greatly interfere with the signal transmitted from the macro cell (Macro eNB) to the macro user equipment (hereinafter, also referred to as MUE).

In the following description, a control information transmission apparatus 100 according to this embodiment is used as the macro cell (Macro eNB) and a control information reception apparatus 200 according to this embodiment is used as the MUE or an LTE-A terminal (UE).

The macro cell (Macro eNB) moves a PDCCH, which is a downlink control signal, to an extension part using carrier aggregation, thereby reducing the power density of a compatible part.

Figure 2:
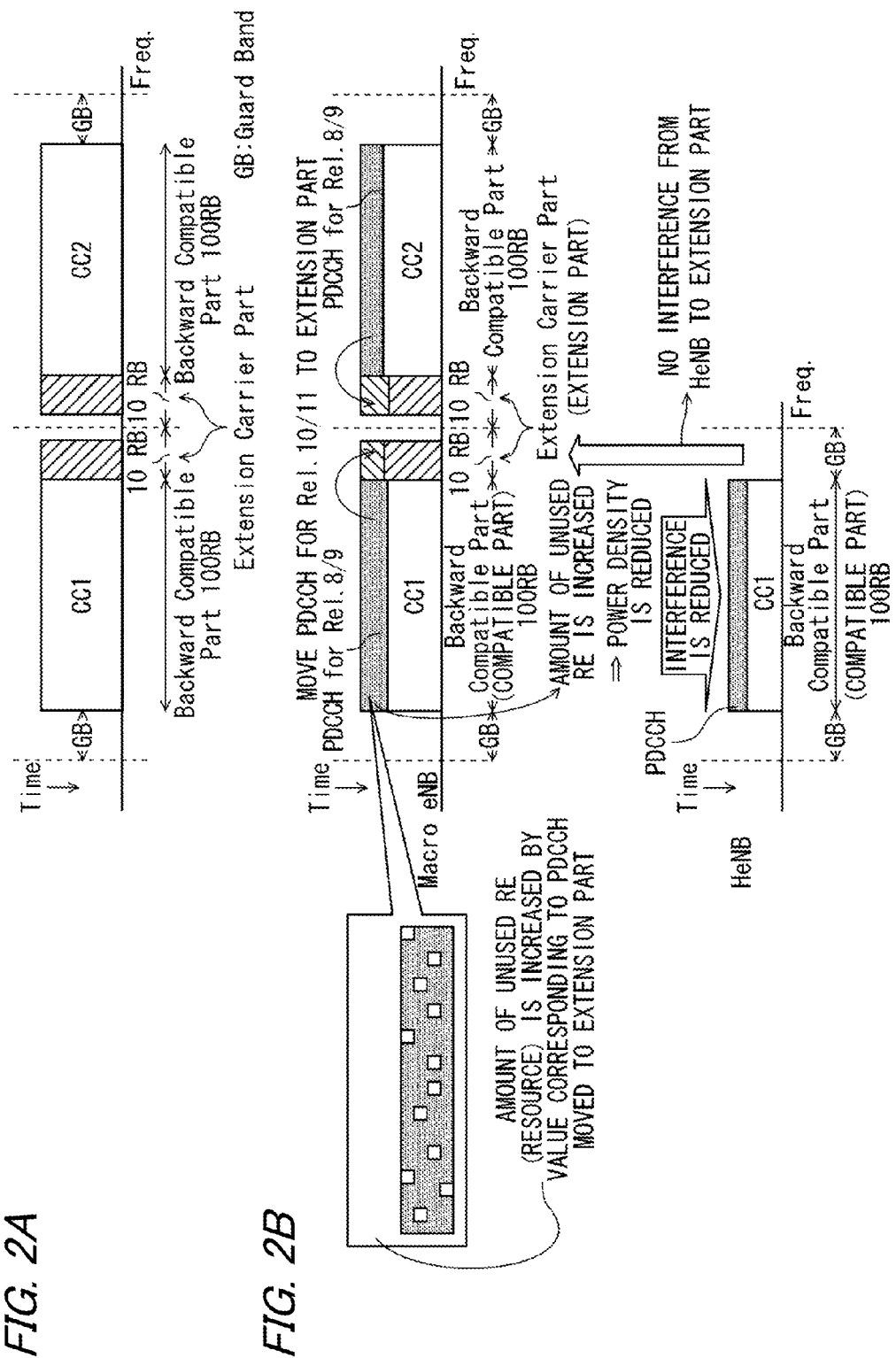
FIG. 2A is a diagram illustrating a plurality of component carriers before the arrangement of a PDCCH and FIG. 2B is a diagram illustrating a plurality of component carriers after the arrangement of the PDCCH.

An example of the arrangement of the PDCCH in the control information transmission apparatus 100 will be described with reference to FIGS. 2A and 2B. FIG. 2A is a diagram illustrating a plurality of component carriers before the arrangement of the PDCCH and FIG. 2B is a diagram illustrating a plurality of component carriers after the arrangement of the PDCCH.

Figure 24:
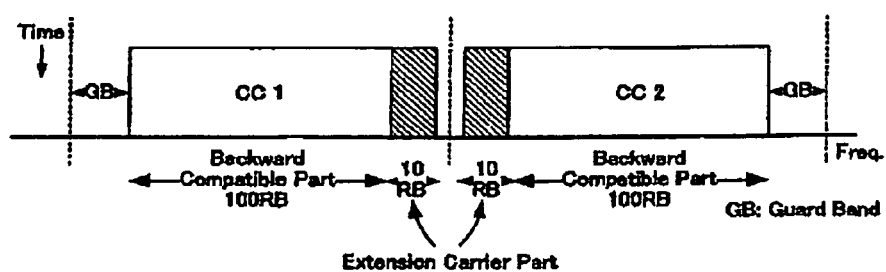
FIG. 24 is a schematic diagram illustrating an extension carrier.
Figure 25:
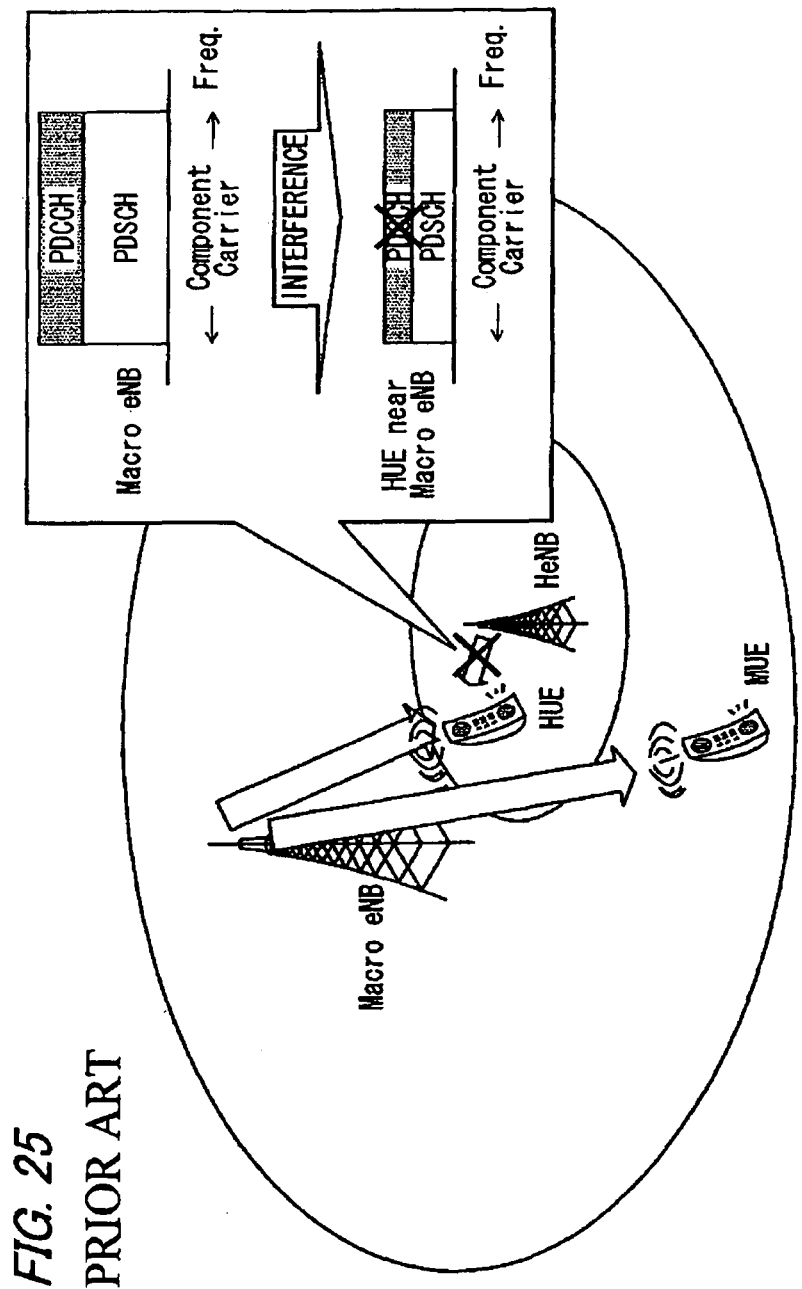
FIG. 25 is a diagram illustrating another example of the HetNet.

In FIGS. 2A and 2B, similarly to FIG. 24, the vertical axis indicates time and the horizontal axis indicates a frequency. In the drawings, in order to distinguish a plurality of component carriers (hereinafter, referred to as CCs), the component carriers are represented by CC1 and CC2, and an extension carrier or a carrier segment is simply represented as an extension carrier part. In the drawings, an RB (Resource Block) is a resource unit including 12 sub-carriers of one sub-frame in LTE or LTE-A. In the drawings, each CC is a sub-frame unit. A backward compatible part is 100 RBs and the extension carrier part is 10 RBs for each CC.

As shown in FIG. 2A, in order to effectively use a frequency band interposed between the plurality of component carriers CC1 and CC2, the extension carrier or the carrier segment is added to the original band (Backward Compatible Part) defined in LTE. In FIG. 2A, the backward compatible part is 100 RBs and the extension carrier part is 10 RBs for each CC. Hereinafter, in some cases, the original band (Backward Compatible Part) defined in LTE is simply referred to as a compatible part, and the extension carrier or the carrier segment is simply referred to as an extension part.

The compatible part is a system band used by a plurality of systems which need to retain compatibility and the extension part is a frequency resource which is provided in a frequency band adjacent to the compatible part and is capable of allocating a transmission signal.

That is, in this embodiment, the system band used by a plurality of systems which need to retain compatibility is a component carrier which is used in both LTE and LTE-Advanced. The frequency resource which is provided in the frequency band adjacent to the compatible part and is capable of allocating the transmission signal is an extension carrier or a carrier segment.

As shown in FIG. 2B, the macro cell (Macro eNB) is arranged in order to transmit a PDCCH for a terminal (UE) after Rel.10 using the extension carrier (extension part). That is, when the extension carrier or the carrier segment is used in the macro cell (Macro eNB), a PDCCH for a so-called LTE-Advanced terminal (UE) corresponding to Rel.10 and Rel.11 is arranged in order for transmission with RBs increased in the extension part. Therefore, as shown in FIG. 2B, the macro cell (Macro eNB) can reduce the number of CCEs used in a PDCCH region of the compatible part, and the amount of REs which are not used in the compatible part increases.

Therefore, it is possible to reduce the interference of the signal, which is transmitted from the macro cell (Macro eNB) to the MUE connected to the macro cell (Macro eNB) and has a power more than that of the signal transmitted from the HeNB to the HUE connected to the HeNB, with the signal transmitted from the HeNB to the HUE.

In particular, among the signals transmitted from the HeNB to the HUE, the PDCCH included in the extension part carries control information required for communication. As shown in FIG. 2B, when the macro cell (Macro eNB) can reduce the number of CCEs used in the PDCCH region of the compatible part, interference with the PDCCH arranged in the compatible part which is received from the HeNB by the HUE is reduced, and the HUE receives, demodulates, and decodes the PDCCH to communicate with the HeNB.

When the HeNB is not provided with the extension part and transmits signals using only CC1 of the compatible part, interference from the HeNB to the extension part is reduced in the macro cell (Macro eNB). Therefore, when control information required for communication is included in the PDCCH of the extension part, the macro cell (Macro eNB) can reliably transmit the PDCCH to a terminal (UE), which is an MUE, after Rel.10.

As shown in FIG. 2B, the CCEs of the PDCCH are interleaved in a different pattern for each eNB, and unused REs are sparsely arranged in the compatible part. Therefore, it is possible to reduce the power density of the entire compatible part.

Next, the procedure of a process of moving the PDCCH for an LTE-A terminal (UE) connected to the macro cell (Macro eNB) to the extension carrier, which is the extension part, will be described.

[When RRC is Used]

Figure 3:
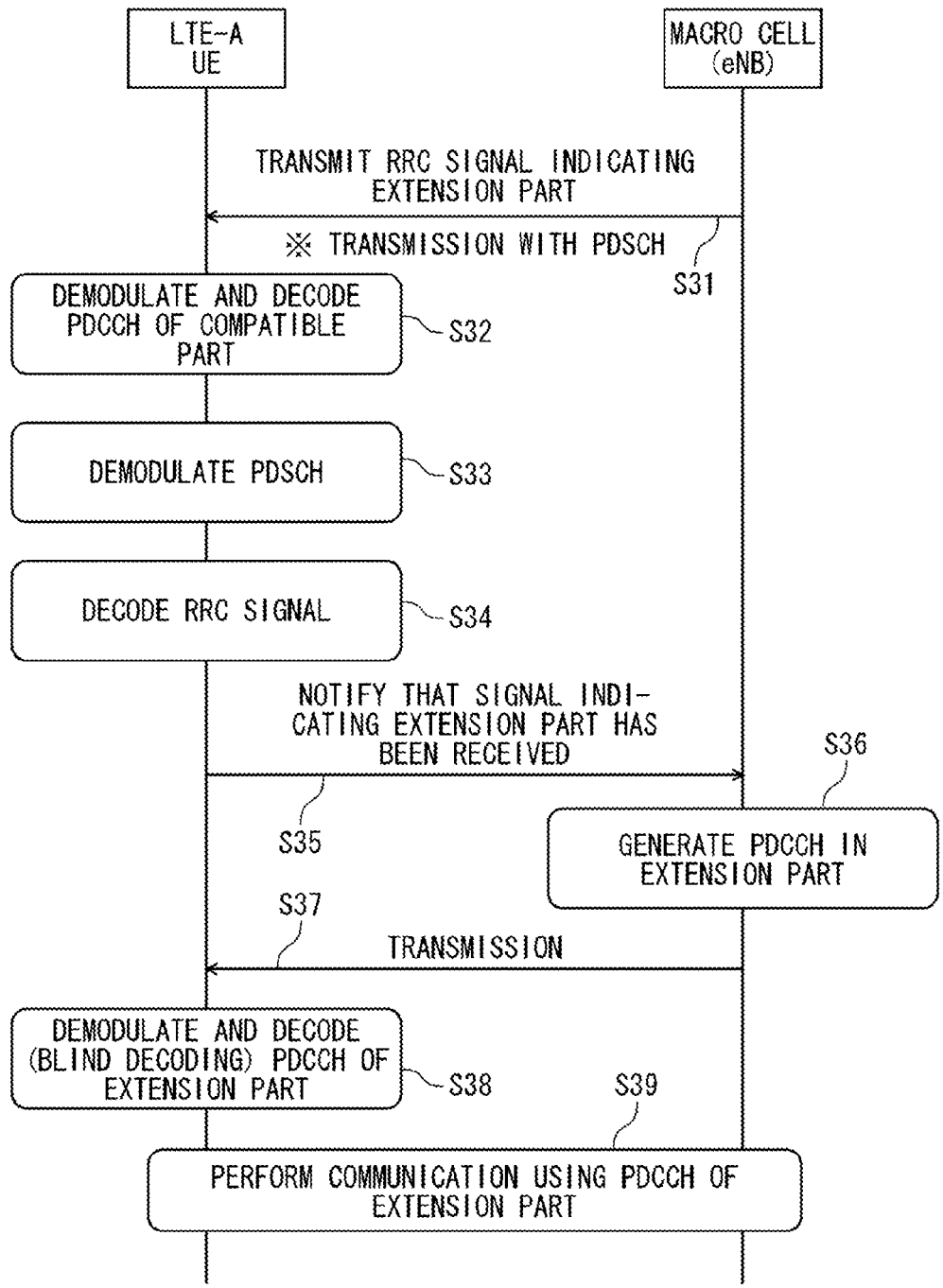
FIG. 3 is a diagram illustrating example (1) of an operation sequence when a PDCCH for an LTE-A terminal (UE) is moved to an extension part.

FIG. 3 is example (1) of an operation sequence when the macro cell (Macro eNB) moves the PDCCH for an LTE-A terminal (LTE-A UE in FIG. 3) to the extension part. In example (1) of the operation sequence shown in FIG. 3, an instruction to move the PDCCH to the extension part is transmitted between the macro cell (Macro eNB) and the LTE-A terminal (UE) using RRC (Radio Resource Control), which is upper control information transmitted by the PDSCH (Physical Downlink Shared Channel). The reason is as follows. (1) In the entire band, since the amount of interference or the effect of frequency diversity is not rapidly changed over time, it may be semi-statically controlled using the RRC. (2) Since the RRC is transmitted to each terminal (UE), the macro cell (Macro eNB) can instruct the individual terminal (UE) when there are a plurality of terminals (UE).

First, in Step S31, the macro cell (Macro eNB) transmits RRC for instructing movement to the PDCCH of the extension part as a data signal which is transmitted by the PDSCH indicated by the PDCCH of the compatible part. The reason is that a terminal (UE) after Rel.10 also uses the PDCCH (common search space) of the compatible part until RRC is signaled.

In Steps S32 to S34, the LTE-A terminal (UE) demodulates and decodes the PDCCH of the compatible part and decodes the RRC signal. In Step S35, the LTE-A terminal (UE) notifies the macro cell (Macro eNB) that an instruction to move to the PDCCH of the extension part has been received.

In Step S36, the macro cell (Macro eNB) generates a PDCCH in the extension part. In Step S37, the macro cell (Macro eNB) transmits the PDCCH to the LTE-A terminal (UE).

The LTE-A terminal (UE) performs blind decoding on the PDCCH of the extension part transmitted from the macro cell (Macro eNB) in Step S38. In Step S39, downlink communication is performed between the LTE-A terminal (UE) and the macro cell (Macro eNB) using the PDCCH of the extension part.

[When BCH is Used]

Figure 4:
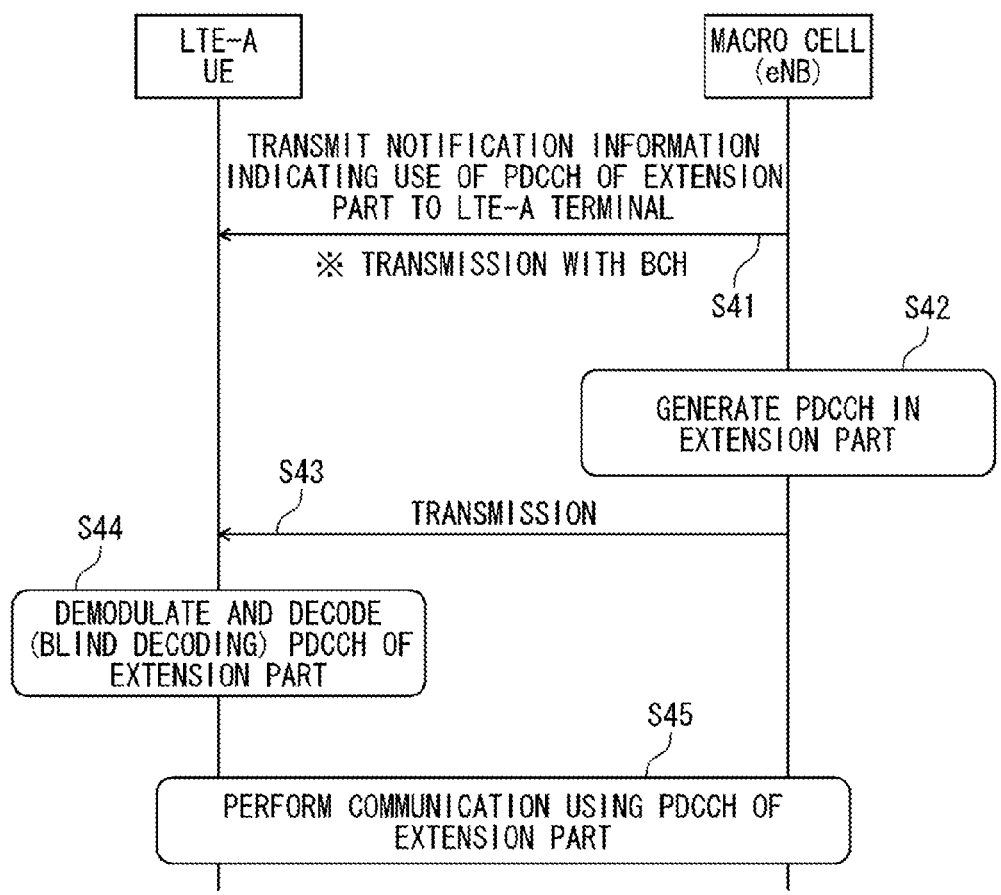
FIG. 4 is a diagram illustrating example (2) of the operation sequence when the PDCCH for an LTE-A terminal (UE) is moved to the extension part.

FIG. 4 shows example (2) of the operation sequence when the PDCCH for an LTE-A terminal (LTE-A UE in FIG. 4) is moved to the extension part. In example (2) of the operation sequence shown in FIG. 4, an instruction to move the PDCCH to the extension part is transmitted between the macro cell (Macro eNB) and the LTE-A terminal (UE) using a BCH (Broadcast Channel). The reason is that, in the entire band, since the amount of interference or the effect of frequency diversity is not rapidly changed over time, it may be semi-statically controlled using the BCH. Since the BCH is a notification signal to all terminals (UE) in the cell, it is difficult to instruct the individual terminal (UE), unlike the RRC.

In Step S41, the macro cell (Macro eNB) inserts information for instructing the LTE-A terminal (UE) to use the PDCCH region of the extension part into the BCH and transmits the BCH to the LTE-A terminal (UE). Then, the macro cell (Macro eNB) generates a PDCCH in the extension part (Step S42) and transmits the PDCCH (Step S43).

The LTE-A terminal (UE) performs blind decoding on the PDCCH of the extension part (Step S44). Then, downlink communication is performed between the LTE-A terminal (UE) and the macro cell (Macro eNB) using the PDCCH of the extension part (Step S45).

<Block Diagram: Control Information Transmission Apparatus 100>

Figure 5:
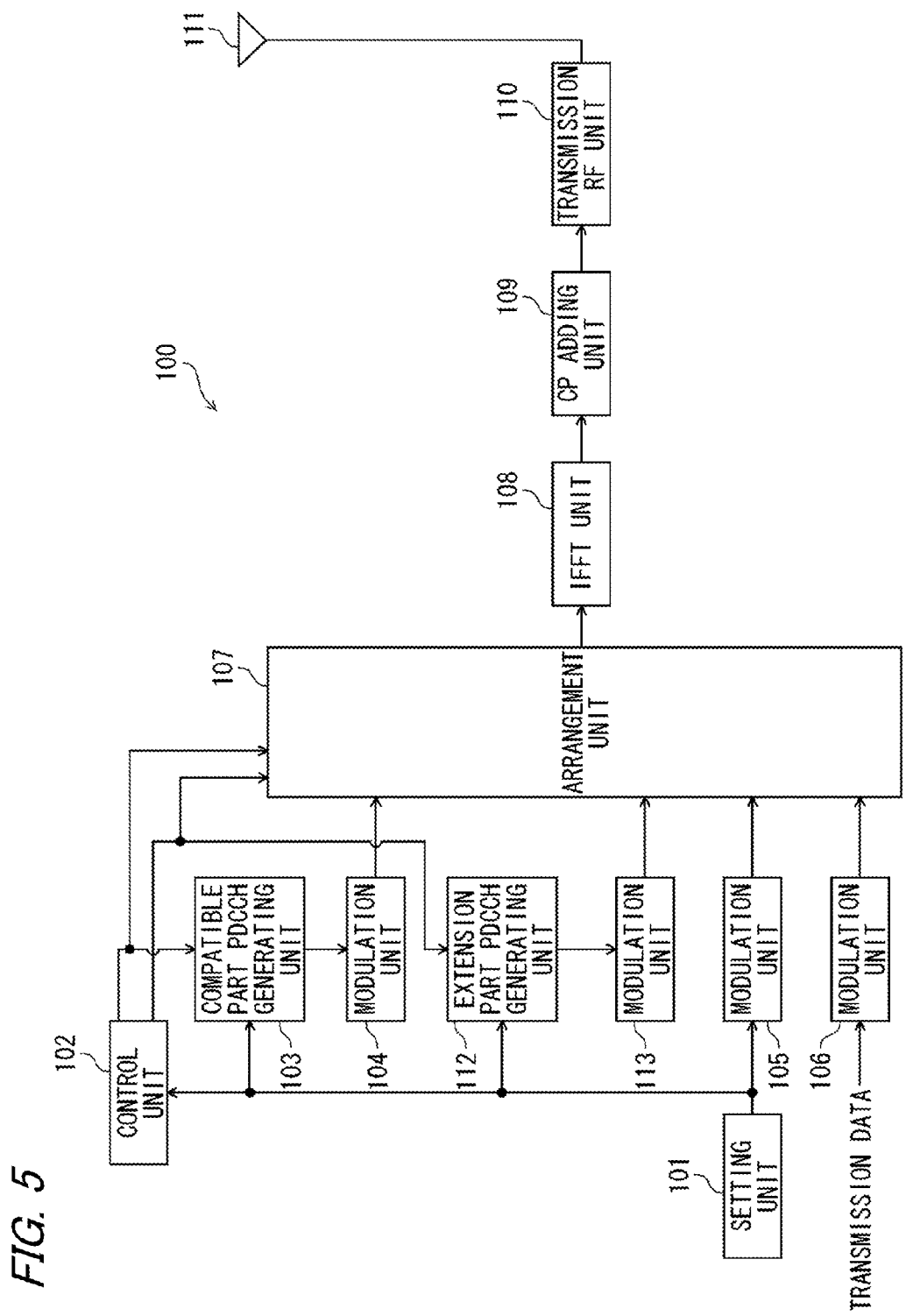
FIG. 5 is a block diagram illustrating the structure of a control information transmission apparatus 100.

Next, the structure of the control information transmission apparatus 100 according to this embodiment will be described with reference to FIG. 5. FIG. 5 is a block diagram illustrating the structure of the control information transmission apparatus 100. As described above, the macro cell (Macro eNB) is the control information transmission apparatus 100 according to this embodiment. The control information transmission apparatus 100 shown in FIG. 5 includes a setting unit 101, a control unit 102, a compatible part PDCCH generating unit 103, a modulation unit 104, a modulation unit 105, a modulation unit 106, an arrangement unit 107, an IFFT unit 108, a CP adding unit 109, a transmission RF unit 110, an antenna 111, an extension part PDCCH generating unit 112, and a modulation unit 113.

The setting unit 101 sets (configures) one or a plurality of resource blocks (RB) used for uplink and downlink for each terminal (UE) according to, for example, the necessary transmission rate or the necessary transmission amount of data. In addition, the setting unit 101 sets a terminal (UE) ID which is different from each resource block to each terminal (UE). The setting unit 101 outputs the set information (configuration information) to the control unit 102 and the compatible part PDCCH generating unit 103.

The control unit 102 generates scheduling information (hereinafter, referred to as "uplink scheduling information") about uplink resources (for example, PUSCH) for allocating uplink data for the LTE-A terminal (UE) or the LTE terminal (UE) and scheduling information hereinafter, referred to as "downlink scheduling information") about downlink resources (for example, PDSCH) for allocating downlink data for the LTE-A terminal (UE) or the LTE terminal (UE), on the basis of the set information input from the setting unit 101. In addition, the control unit 102 generates uplink scheduling information about uplink resources (for example, PUSCH) for allocating uplink data for the LTE-A terminal (UE) or the LTE terminal (UE), on the basis of the set information input from the setting unit 101.

Then, the control unit 102 outputs the uplink scheduling information and the downlink scheduling information to the compatible part PDCCH generating unit 103 and the arrangement unit 107. In addition, the control unit 102 outputs the uplink scheduling information for the LTE-A terminal (UE) or the LTE terminal (UE) to the arrangement unit 107.

The compatible part PDCCH generating unit 103 allocates the uplink scheduling information and the downlink scheduling information for the LTE terminal (UE) which are input from the control unit 102 as DCI (Downlink Control Information) to the PDCCH arranged in the resource block (RB) which is set to each LTE terminal (UE), on the basis of the set information input from the setting unit 101. In addition, the compatible part PDCCH generating unit 103 adds a CRC (Cyclic Redundancy Check) bit to the PDCCH to which the uplink scheduling information and the downlink scheduling information for the LTE terminal (UE) are allocated, and masks (or scrambles) the CRC bit with the LTE terminal (UE) ID input from the setting unit 101. Then, the compatible part PDCCH generating unit 103 outputs the masked PDCCH to the modulation unit 104.

The modulation unit 104 performs channel coding, modulation, and interleaving on the PDCCH input from the compatible part PDCCH generating unit 103 and outputs the interleaved PDCCH to the arrangement unit 107.

The modulation unit 105 modulates the set information input from the setting unit 101 and outputs the modulated set information to the arrangement unit 107.

The modulation unit 106 performs channel coding and modulation on the input transmission data (downlink data) and outputs the modulated data signal to the arrangement unit 107.

The arrangement unit 107 multiplexes the PDCCH input from the modulation unit 104, the set information input from the modulation unit 105, and the data signal (That is, PDSCH) input from the modulation unit 106. The arrangement unit 107 arranges (multiplexes) the PDCCH and the data signal (PDSCH) in each resource block (RB) on the basis of the downlink scheduling information for the LTE-A terminal (UE) or the LTE terminal (UE) which is input from the control unit 102. The arrangement unit 107 may arrange the set information in the PDSCH.

The arrangement unit 107 outputs the multiplexed signal to the IFFT (Inverse Fast Fourier Transform) unit 108.

The IFFT unit 108 performs IFFT on the signal input from the arrangement unit 107 and acquires a signal in the time region. Then, the IFFT unit 108 outputs the signal in the time region to the CP (Cyclic Prefix) adding unit 109.

The CP adding unit 109 adds a CP to the signal in the time region which is input from the IFFT unit 108 and the signal having the CP added thereto to the transmission RF (Radio Frequency) unit 110.

The transmission RF unit 110 performs transmission processes, such as D/A (Digital to Analog) conversion, up-conversion, and amplification, on the signal input from the CP adding unit 109 and wirelessly transmits the signal subjected to the transmission processes from the antenna 111 to the LTE terminal (UE).

The extension part PDCCH generating unit 112 allocates the uplink scheduling information and the downlink scheduling information for the LTE-A terminal (UE) which are output from the control unit 102 to the PDCCH which is arranged in the resource block (RBs) set to each LTE-A terminal (UE) on the basis of the set information input from the setting unit 101.

In addition, the extension part PDCCH generating unit 112 adds a CRC (Cyclic Redundancy Check) bit to the PDCCH to which the uplink scheduling information and the downlink scheduling information for the LTE-A terminal (UE) are allocated and masks (or scrambles) the CRC bit with the LTE-A terminal (UE) ID input from the setting unit 101. Then, the extension part PDCCH generating unit 112 outputs the masked PDCCH to the modulation unit 113.

The modulation unit 113 performs channel coding, modulation, and interleaving on the PDCCH for the extension part which is input from the extension part PDCCH generating unit 112 and outputs the interleaved PDCCH to the arrangement unit 107.

<Block Diagram: Control Information Reception Apparatus 200>

Figure 6:
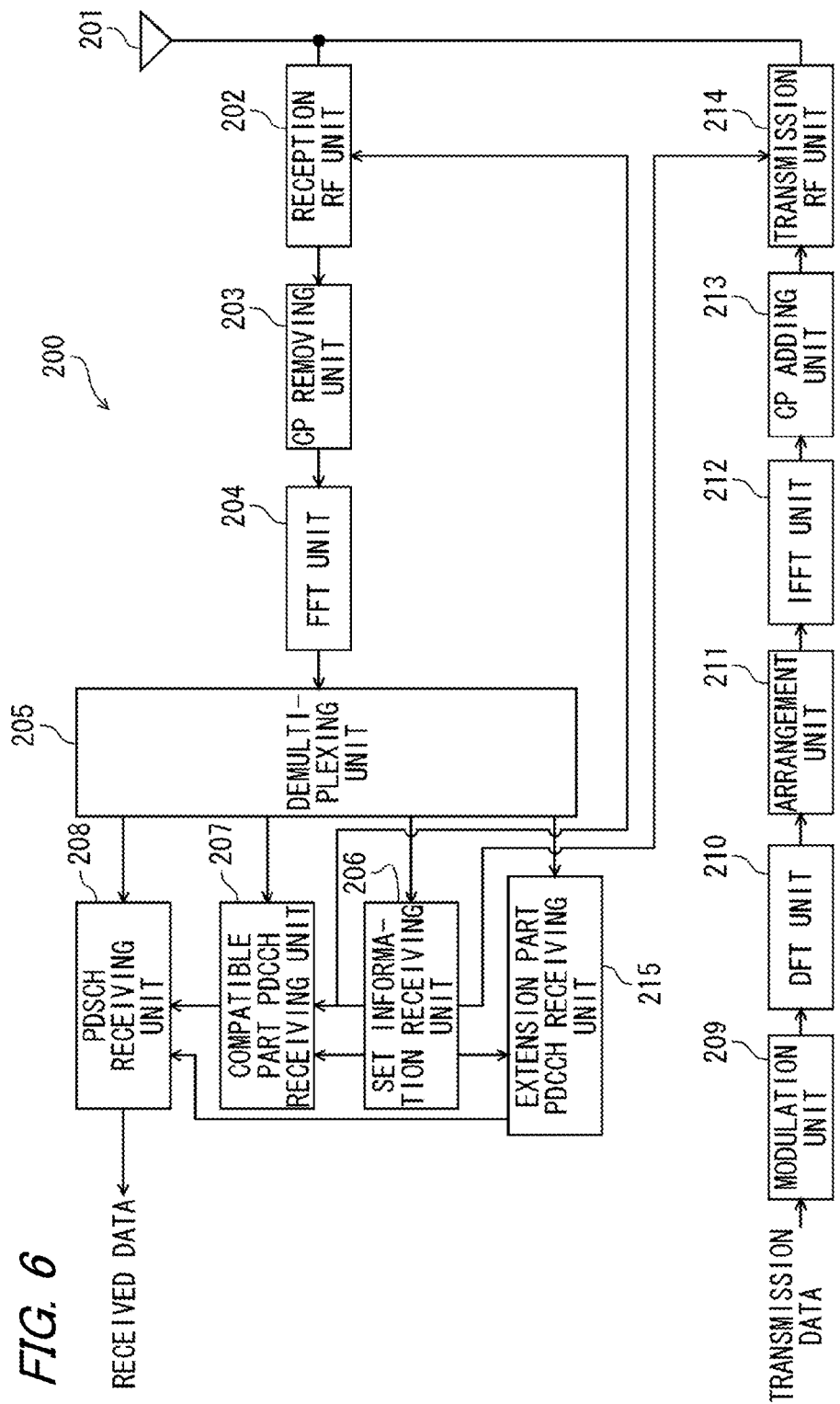
FIG. 6 is a block diagram illustrating the structure of a control information reception apparatus 200.

Next, the structure of the control information reception apparatus 200 according to this embodiment will be described with reference to FIG. 6. FIG. 6 is a block diagram illustrating the structure of the control information reception apparatus 200. The control information reception apparatus 200 shown in FIG. 6 includes an antenna 201, a reception RF unit 202, a CP removing unit 203, an FFT unit 204, a demultiplexing unit 205, a set information receiving unit 206, a compatible part PDCCH receiving unit 207, a PDSCH receiving unit 208, a modulation unit 209, a DFT unit 210, an arrangement unit 211, an IFFT unit 212, a CP adding unit 213, a transmission RF unit 214, and an extension part PDCCH receiving unit 215.

The reception RF unit 202 is configured to change a reception band. The reception RF unit 202 changes the reception band on the basis of band information input from the set information receiving unit 206. Then, the reception RF unit 202 performs a reception RF process (for example, down-conversion and A/D (Analog-to-Digital) conversion) on an RF signal (in this embodiment, an OFDM (Orthogonal Frequency Division Multiplex) signal) received through the antenna 201 and outputs the obtained received signal to the CP removing unit 203.

The CP removing unit 203 removes a CP (Cyclic Prefix) from the received signal input from the reception RF unit 202 and outputs the signal from which CP is removed to the FFT (Fast Fourier Transform) unit 204.

The FFT unit 204 performs FFT on the signal input from the CP removing unit 203 and acquires a signal in a frequency region. Then, the FFT unit 204 outputs the signal in the frequency region to the demultiplexing unit 205.

The demultiplexing unit 205 demultiplexes the signal in the frequency region which is input from the FFT unit 204 into an upper-layer control signal (for example, RRC (Radio Resource Control) signaling) including set information, a PDCCH, and a data signal (that is, a PDSCH). Then, the demultiplexing unit 205 outputs the upper-layer control signal including the set information to the set information receiving unit 206, outputs the PDCCH to the compatible part PDCCH receiving unit 207, and outputs the PDSCH to the PDSCH receiving unit 208.

The set information receiving unit 206 reads information indicating the uplink and downlink resource blocks set to a host apparatus from the control signal input from the demultiplexing unit 205, outputs information about the downlink resource block as band information to the compatible part PDCCH receiving unit 207 and the reception RF unit 202, and outputs information about the uplink resource block as band information to the transmission RF unit 214. In addition, the set information receiving unit 206 reads a mobile station ID set to the host apparatus from the control signal input from the demultiplexing unit 205 and outputs the mobile station ID to the compatible part PDCCH receiving unit 207.

The set information receiving unit 206 reads information about the uplink resource block set to the host apparatus from the control signal input from the demultiplexing unit 205 and outputs the information about the uplink resource block as band information to the transmission RF unit 214. In addition, the set information receiving unit 206 reads the mobile station ID set to the host apparatus from the control signal input from the demultiplexing unit 205 and outputs the mobile station ID to the compatible part PDCCH receiving unit 207.

The compatible part PDCCH receiving unit 207 blind-receives (blind-decodes) the PDCCH input from the demultiplexing unit 205. The PDCCH is arranged in each downlink resource block which is included in the band information input from the set information receiving unit 206 and is set to the host apparatus. The compatible part PDCCH receiving unit 207 reads downlink scheduling information included in the PDCCH and outputs the downlink scheduling information to the PDSCH receiving unit 208. When the PDCCH includes uplink scheduling information, the compatible part PDCCH receiving unit 207 reads the uplink scheduling information and outputs the uplink scheduling information to the arrangement unit 211.

The PDSCH receiving unit 208 demodulates the PDSCH input from the demultiplexing unit 205 on the basis of the downlink scheduling information input from the compatible part PDCCH receiving unit 207 and the extension part PDCCH receiving unit 215 and acquires received data.

The modulation unit 209 performs channel coding and modulation on the input transmission data (uplink data) and outputs the modulated data signal to the DFT (Discrete Fourier Transform) unit 210.

The DFT unit 210 performs FFT on the data signal input from the modulation unit 209 and acquires a signal in the frequency region. Then, the DFT unit 210 outputs the signal in the frequency region to the arrangement unit 211.

The arrangement unit 211 arranges the signal in the frequency region which is input from the DFT unit 210 in the PUSCH arranged in the uplink resource block on the basis of the uplink scheduling information input from the compatible part PDCCH receiving unit 207.

The IFFT unit 212 performs IFFT on the signal in the frequency region which is input from the arrangement unit 211 and acquires a signal in the time region. Then, the IFFT unit 212 outputs the signal in the time region to the CP adding unit 213.

The CP adding unit 213 adds a CP to the signal in the time region which is input from the IFFT unit 212 and outputs the signal having the CP added thereto to the transmission RF unit 214.

The transmission RF unit 214 performs transmission processes, such as D/A (Digital-to-Analog) conversion, up-conversion, and amplification, on the signal input from the CP adding unit 213 and wirelessly transmits the signal subjected to the transmission processes from the antenna 201 to the LTE base station.

The extension part PDCCH receiving unit 215 receives the PDCCH transmitted by the extension part and blind-receives (blind-decodes) the PDCCH input from the demultiplexing unit 205. The subsequent operation is the same as that of the compatible part PDCCH receiving unit 207. The PDCCH is arranged in each downlink resource block which is included in the band information input from the set information receiving unit 206 and is set to the host apparatus. The extension part PDCCH receiving unit 215 reads the downlink scheduling information included in the PDCCH and outputs the downlink scheduling information to the PDSCH receiving unit 208. When the PDCCH includes uplink scheduling information, the extension part PDCCH receiving unit 215 reads the uplink scheduling information and outputs the uplink scheduling information to the arrangement unit 211.

Next, examples (1) to (4) of a method of setting the PDCCH region in the extension part will be described with reference to FIGS. 7 to 10. In LTE, the PDCCH is set in the range from a first OFDM symbol to a third OFDM symbol from the head of the sub-frame and is notified by a PCFICH (Physical Control Format Indicator CHannel).

In FIGS. 7 to 10, similarly to FIG. 24, the vertical axis indicates time (Time) and the horizontal axis indicates a frequency. In the drawings, in order to distinguish a plurality of component carriers (CCs), the component carriers are represented by CC1 and CC2, and an extension carrier or a carrier segment is represented as an extension part. In addition, a backward compatible part is represented as a compatible part. In the drawings, RB (Resource Block) is a resource unit including 12 sub-carriers of one sub-frame in LTE or LTE-A. In the drawings, each CC is a sub-frame unit. The backward compatible part is 100 RBs and the extension carrier part is 10 RBs for each CC.

Figure 7:
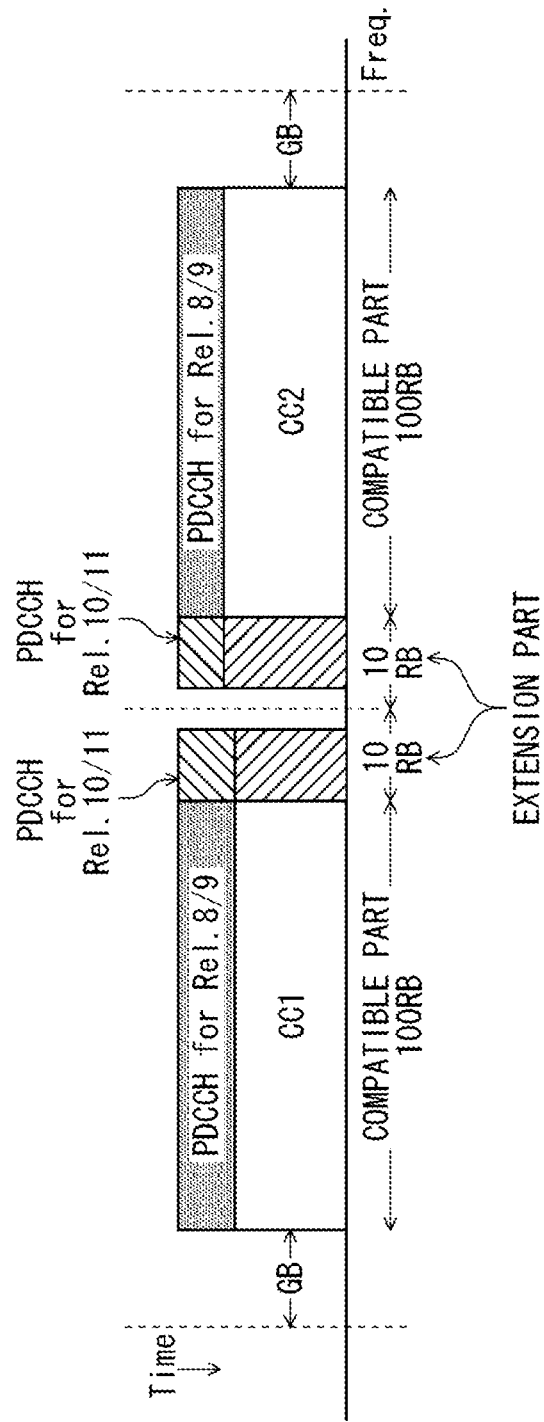
FIG. 7 is a diagram illustrating example (1) of a method of setting a PDCCH region in the extension part.

FIG. 7 shows the example (1) of the method of setting the PDCCH region in the extension part. As shown in FIG. 7, as viewed from the time axis, a PDCCH region for an LTE-A terminal (UE) (in FIG. 7, represented by PDCCH for Rel.10/11) in the extension part is the same as a PDCCH in the compatible part. In this case, the PDCCH of the compatible part and the PDCCH of the extension part can share the PCFICH of the compatible part. Therefore, the control information transmission apparatus 100 does not transmit a new signal for indicating a PDCCH region, such as a PCFICH, in the extension part. In the case of the carrier segment, the band extended by the carrier segment is a resource associated with CC1 or CC2 and is not used to treat different CCs. Therefore, the method shown in FIG. 7 is suitable for the carrier segment.

Figure 8:
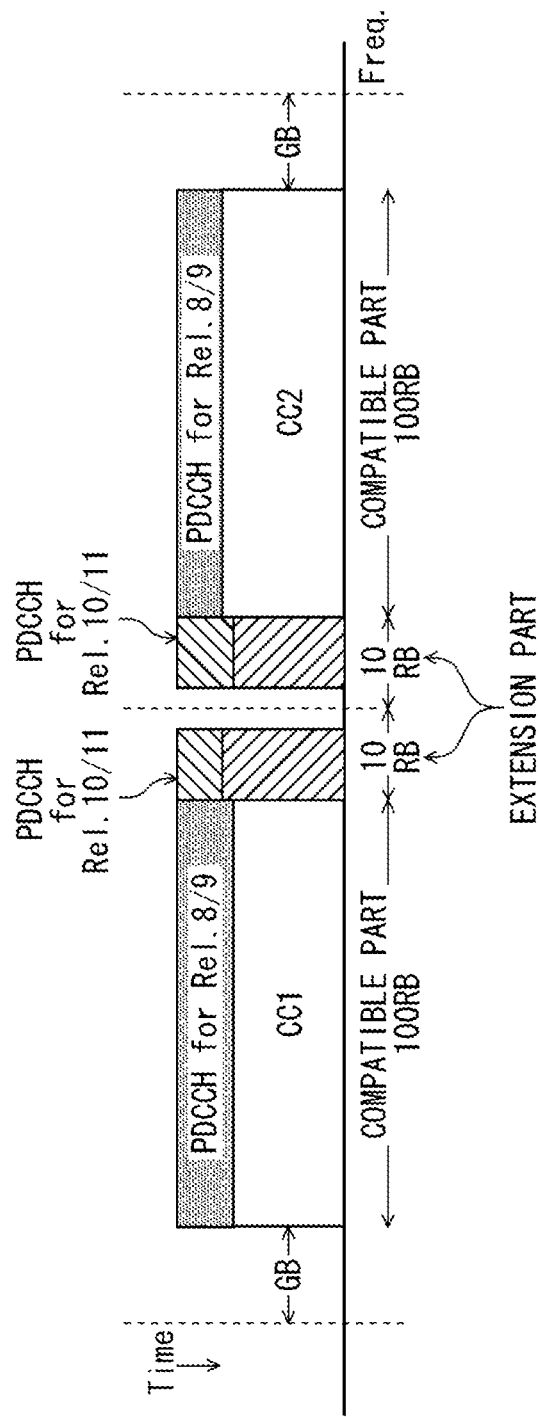
FIG. 8 is a diagram illustrating example (2) of a method of setting a PDCCH region in the extension part.

FIG. 8 shows the example (2) of the method of setting the PDCCH region in the extension part. In FIG. 8, a PDCCH region for an LTE-A terminal (UE (in FIG. 8, represented by PDCCH for Rel.10/11) in the extension part is set independently from the PDCCH of the compatible part. In this case, it is necessary to transmit a new PCFICH or a signal for the same notification as the PCFICH in the extension part. However, when the extension part is the extension carrier, the band extended by the extension carrier is treated as a different CC, which is close to the RAN1 agreement regarding the setting of the PDCCH region for each CC. The set method shown in FIG. 8 has high standard affinity.

Figure 9:
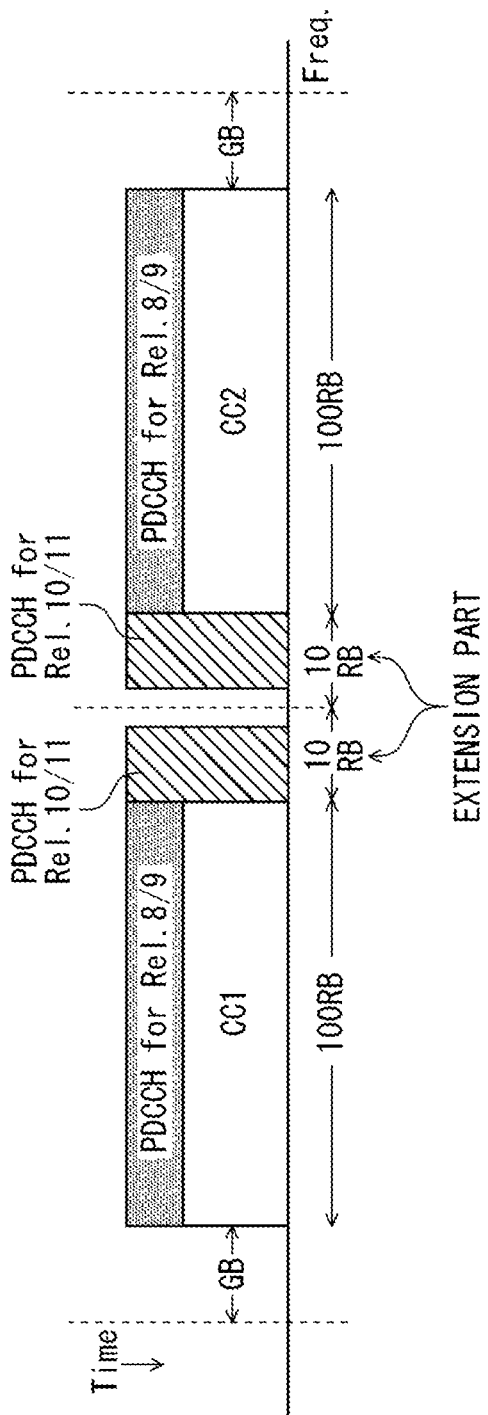
FIG. 9 is a diagram illustrating example (3) of a method of setting a PDCCH region in the extension part.

FIG. 9 shows the example (3) of the method of setting the PDCCH region in the extension part. In FIG. 9, the entire extension part corresponding to 10 RBs is set to a PDCCH region for an LTE-A terminal (UE) (in FIG. 9, represented by PDCCH for Rel.10/11). When one sub-frame includes 14 OFDM symbols and 1 RB includes 12 sub-carriers, the entire extension part is 1680 REs (=14×10×12) and corresponds to about 1.2 OFDM symbols for the entire compatible part corresponding to 100 RBs. Therefore, when the entire extension part is set to the PDCCH region for an LTE-A terminal (UE), it is possible to effectively reduce the PDCCH power density of the compatible part.

Figure 10:
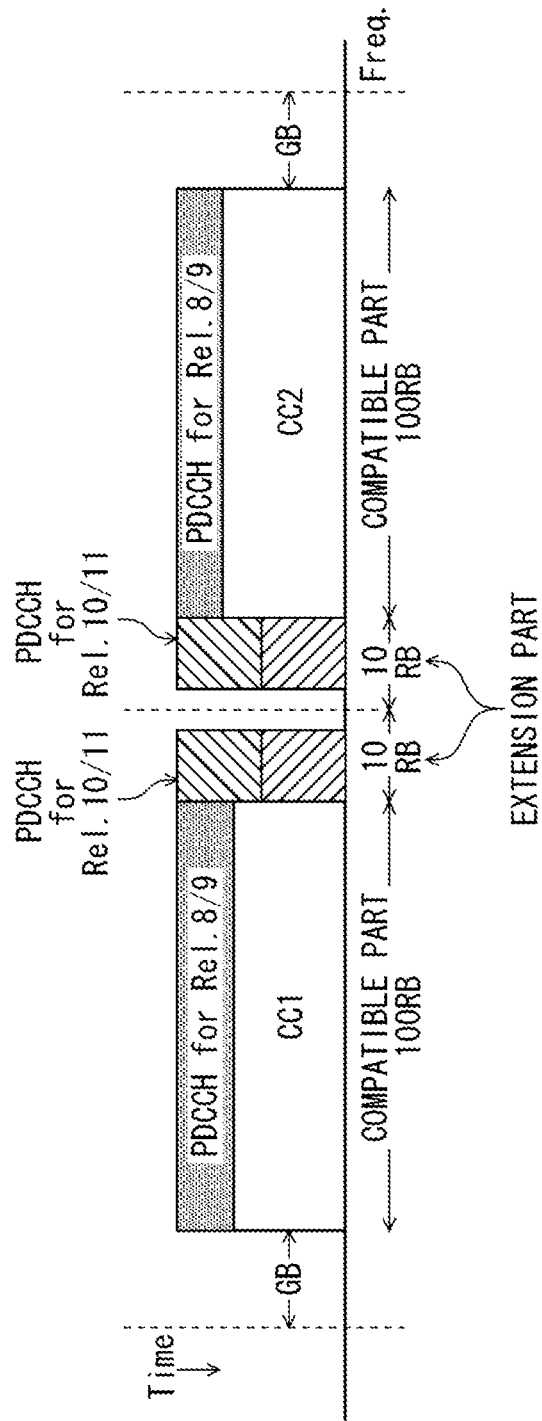
FIG. 10 is a diagram illustrating example (4) of a method of setting a PDCCH region in the extension part.

FIG. 10 shows the example (4) of the method of setting the PDCCH region in the extension part. In FIG. 10, the first half of the sub-frame of the extension part is the PDCCH region for an LTE-A terminal (UE). In this case, the reception of the PDCCH is completed in the middle of the sub-frame, as compared to the case in which the entire extension part is OFDM symbols. Therefore, the second half of the sub-frame can be used for the microsleep of the terminal (UE). The microsleep means a control process of stopping the operation of a circuit for the time when processing is not needed, thereby reducing power consumption.

According to the examples (1) to (4) of the method of setting the PDCCH region in the extension part, the number of signals in the PDCCH region of the compatible part of the macro cell (Macro eNB) is reduced and the PDCCH of the macro cell (Macro eNB) can reduce the interference of the PDCCH from the HeNB to the HUE. In addition, interference to the PDCCH of the macro cell (Macro eNB) moved to the extension part is small. Therefore, the macro cell (Macro eNB) can expect that the interference of the extension part will be small and can transmit the PDCCH in the extension part using resources smaller than that in the compatible part. Therefore, it is possible to effectively reduce the power density of the compatible part. This effect is particularly effective in the HetNet environment shown in FIG. 1 in which the signal transmitted from the HeNB to the HUE is likely to greatly interfere with the signal transmitted from the macro cell (Macro eNB) to the MUE.

According to this embodiment, the control information transmission apparatus 100 allocates the PDCCH for an LTE-A terminal (UE) to the extension part (Extension Carrier or Carrier Segment), thereby reducing the amount of resources used in the PDCCH region of the compatible part (Backward Compatible Part). Therefore, it is possible to reduce the number of signals in the PDCCH region of the compatible part. As a result, for example, in the HetNet environment shown in FIG. 1, the control information transmission apparatus 100 can effectively reduce interference power which is given from the signal transmitted by the host apparatus to the signal (for example, PDCCH) transmitted from the HeNB to the HUE.

In particular, among the signals transmitted from the HeNB to the HUE, control information required for communication is transmitted by the PDCCH included in the compatible part. Therefore, when the control information transmission apparatus 100, which is Macro eNB, can reduce the amount of resources used in the PDCCH region of the compatible part among the signals transmitted by the host apparatus, it can reduce interference with the PDCCH arranged in the compatible part which is received from the HeNB by the HUE, and the HUE can receive, demodulate, and decode the PDCCH in the HetNet environment shown in FIG. 1. In this way, the HUE can communicate with the HeNB.

According to this embodiment, in the control information transmission apparatus 100, some or all of the signals in the PDCCH region of the compatible part are set to the PDCCH region of the extension part. For example, in the HetNet environment shown in FIG. 1, when the HeNB is not provided with the extension part and transmits a signal using only the compatible part (see FIG. 2B), the interference of the signals transmitted from the HeNB to the control information reception apparatus 200 with the extension part is reduced. Therefore, when control information required for communication is included in the PDCCH of the extension part in the control information transmission apparatus 100, the control information reception apparatus 200 can reliably receive the PDCCH.

(First Modification)

Next, a control information transmission apparatus 100A and a control information reception apparatus 200A according to a first modification of the first embodiment will be described with reference to FIGS. 11A to 19.

In this modification, the control information transmission apparatus 100A transmits control information to the LTE-A terminal (UE) using the PDCCH region of the compatible part and the PDCCH region of the extension part. Therefore, the control information transmission apparatus 100A can obtain frequency diversity and a high interference resistance performance.

In this modification, similarly to the first embodiment, the HetNet environment shown in FIG. 1 is assumed. Therefore, the signal transmitted from the HeNB to the HUE is likely to receive large interfere from the signal transmitted from the macro cell (Macro eNB) to the MUE.

The control information transmission apparatus 100A according to the first modification differs from the control information transmission apparatus 100 according to the first embodiment in the method in which the compatible part PDCCH generating unit 103 and the extension part PDCCH generating unit 112 allocate the PDCCH arranged in the resource block (RB), and is similar in operation to the control information transmission apparatus 100 according to the first embodiment except for that point. Therefore, the detailed description thereof will not be repeated.

Figures 11A, 11B:
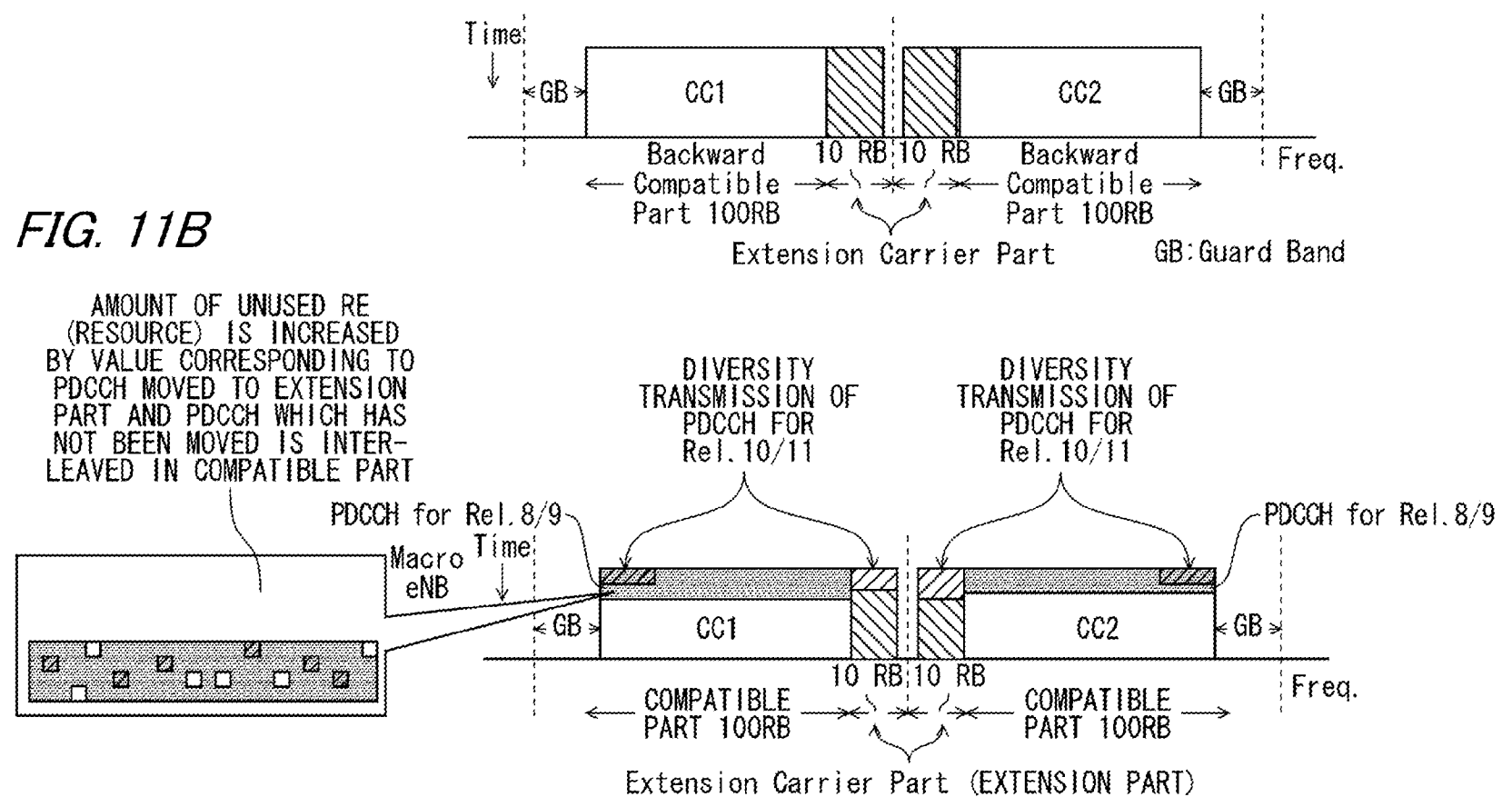

FIGS. 11A and 11B are diagrams illustrating a method (1) of allocating the PDCCH arranged in the resource block (RB). In FIGS. 11A and 11B, similarly to FIG. 24, the vertical axis indicates time and the horizontal axis indicates a frequency. In the drawings, in order to distinguish a plurality of component carriers (CCs), the component carriers are represented by CC1 and CC2, and an extension carrier or a carrier segment is simply represented as an extension carrier part. In the drawings, RB (Resource Block) is a resource unit including 12 sub-carriers of one sub-frame in LTE or LTE-A. In the drawings, each CC is a sub-frame unit. A backward compatible part is 100 RBs and the extension carrier part (extension part) is 10 RBs for each CC.

The compatible part is a system band used by a plurality of systems which need to retain compatibility and the extension part is a frequency resource which is provided in a frequency band adjacent to the compatible parts and is capable of allocating a transmission signal.

That is, in this modification, similarly to the embodiment, the system band used by a plurality of systems which need to retain compatibility is a component carrier which is used in both LTE and LTE-Advanced. The frequency resource which is provided in the frequency band adjacent to the compatible part and is capable of allocating the transmission signal is an extension carrier or a carrier segment.

As shown in FIGS. 11A and 11B, in this modification, in the control information transmission apparatus 100A (macro cell (Macro eNB)), a portion of the PDCCH which has been originally transmitted in the compatible part is moved to the extension part. Therefore, the amount of REs (resources) which are not used is increased by a value corresponding to the PDCCH moved to the extension part and the power density of the PDCCH region of the compatible part is reduced.

Therefore, for example, as a method of designating the PDCCH region, a CCE (Control Channel Element) number which is consecutive to the compatible part is defined in the extension part and a plurality of CCE regions used are designated. When the designated CCE region is included in the extension part, the control information reception apparatus 200A recognizes the PDCCH of the extension part even though the control information transmission apparatus 100A does not explicitly designate the compatible part or the extension part.

However, since the PDCCH region of the compatible part requires backward compatibility such that it is also used by the LTE (Rel.8 or Rel.9) terminal (UE), the interleaving of the CCE does not vary. Therefore, the CCE interleaving pattern of the extension part is defined independently from the compatible part.

Next, in this modification, the method in which the compatible part PDCCH generating unit 103 and the extension part PDCCH generating unit 112 allocate the PDCCH arranged in the resource block (RB) will be described with reference to FIGS. 12 to 19. In the example shown in FIGS. 12 to 19, CCE numbers consecutive to the extension part are defined in the compatible part in advance.

When the number of CCEs in the extension part is less than that of CCEs in the compatible part and 2 CCEs or 4 CCEs are allocated to the entire compatible part, the CCEs of a plurality of compatible parts correspond to the CCEs of the same extension part such that the compatible parts which overlap each other are not simultaneously used.

[Example (1) of PDCCH Allocation]

Figure 12:
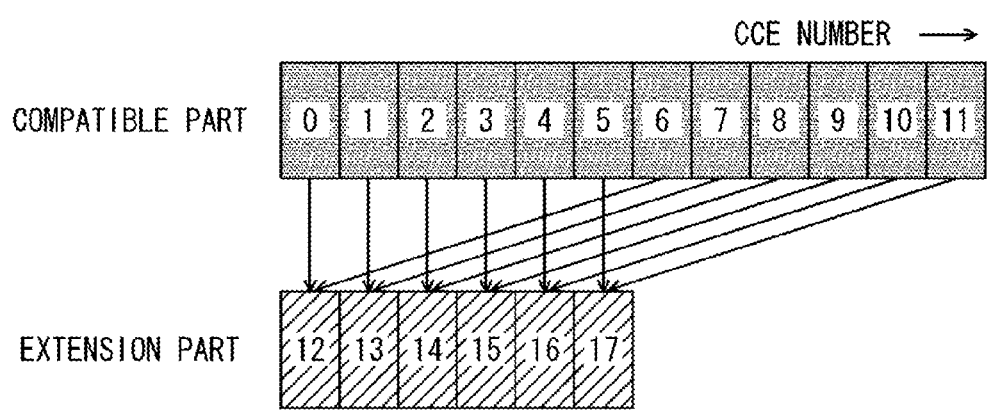
FIG. 12 is a diagram illustrating example (1) of PDCCH allocation.

FIG. 12 shows example (1) of PDCCH allocation. In the example shown in FIG. 12, CCE numbers 0 to 11 are given to the CCEs of the compatible part and CCE numbers 12 to 17 consecutive to CCE number 11 are given to the CCEs of the extension part. In the example shown in FIG. 12, two CCEs with CCE numbers 0 and 6, which are a portion of the compatible part, correspond to one CCE with CCE number 12, which is a portion of the extension part.

Therefore, in a case in which the CCE with CCE number 12, which is a portion of the extension part, is used as the PDCCH region, when the CCE with CCE number 0, which is a portion of the compatible part, is used as the PDCCH region, the CCE with CCE number 6 is not used as the PDCCH region. Similarly, when the CCE with CCE number 13, which is a portion of the extension part, is used as the PDCCH region, when the CCE with CCE number 1, which is a portion of the compatible part, is used as the PDCCH region, the CCE with CCE number 7 is not used as the PDCCH region. Therefore, the control information transmission apparatus 100A can reduce the interference of the compatible part by a value corresponding to the CCEs which are not used in the compatible part since they overlap each other.

[Example (2) of PDCCH Allocation]

Figure 13:
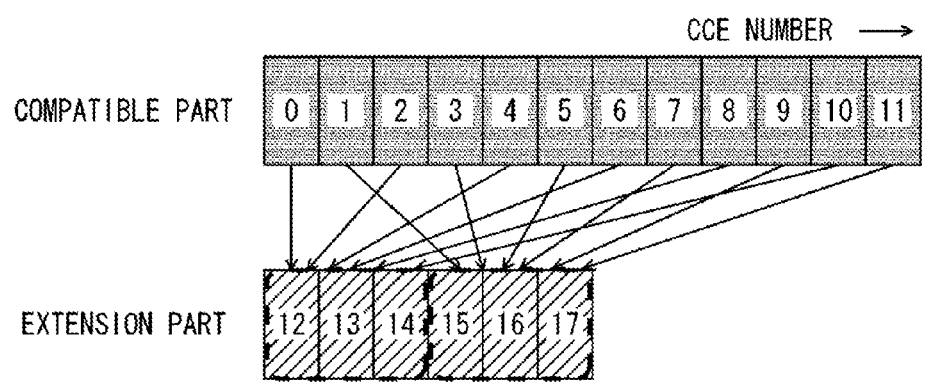
FIG. 13 is a diagram illustrating example (2) of PDCCH allocation.

FIG. 13 shows example (2) of PDCCH allocation. In the example shown in FIG. 13, CCE numbers 0 to 11 are given to the CCEs of the compatible part and CCE numbers 12 to 17 consecutive to CCE number 11 are given to the CCEs of the extension part. In the example shown in FIG. 13, six CCEs with CCE numbers 0, 2, 4, 6, 8, and 10, which are a portion of the compatible part, correspond to three CCEs with CCE numbers 12 to 14, which are a portion of the extension part. In addition, six CCEs with CCE numbers 1, 3, 5, 7, 9, and 11, which are a portion of the compatible part, correspond to three CCEs with CCE numbers 15 to 17, which are a portion of the extension part.

Therefore, for example, in a case in which three CCEs with CCE numbers 12 to 14, which are a portion of the extension part, are used as the PDCCH region, when one CCE with CCE number 0, which is a portion of the compatible part, is used as the PDCCH region, the remaining allocated five CCEs with CCE numbers 2, 4, 6, 8, and 10 are not used as the PDCCH region. Similarly, in a case in which three CCEs with CCE numbers 15 to 17, which are a portion of the extension part, are used as the PDCCH region, when one CCE with CCE number 1, which is a portion of the compatible part, is used as the PDCCH region, the remaining allocated five CCEs with CCE numbers 3, 5, 7, 9, and 11 are not used as the PDCCH region. Therefore, the control information transmission apparatus 100A can reduce the interference of the compatible part by a value corresponding to the CCEs which are not used in the compatible part since they overlap each other.

The amount of division between the compatible part and the extension part may be changed considering the interference between the frequency diversity gain of the compatible part and the compatible part. For example, in a case in which four CCEs are allocated as a whole, when interference is small, two CCEs are allocated to the compatible part and two CCEs are allocated to the extension part, thereby obtaining a high frequency diversity gain. When interference is large, one CCE is allocated to the compatible part and three CCEs are allocated to the extension part, thereby reducing interference.

[Example (3) of PDCCH Allocation]

Figure 14:
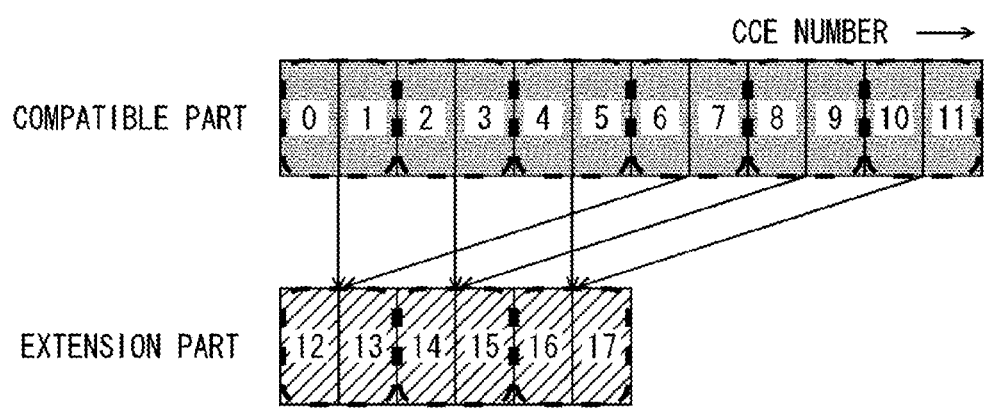
FIG. 14 is a diagram illustrating example (3) of PDCCH allocation.

FIG. 14 shows example (3) of PDCCH allocation. In the example shown in FIG. 14, CCE numbers 0 to 11 are given to the CCEs of the compatible part and CCE numbers 12 to 17 consecutive to CCE number 11 are given to the CCEs of the extension part. In the example shown in FIG. 14, two CCEs with CCE numbers 0 and 1, which are a portion of the compatible part, and two CCEs with CCE numbers 6 and 7, which are a portion of the compatible part, correspond to two CCEs with CCE numbers 12 and 13, which are a portion of the extension part. Similarly, two CCEs with CCE numbers 2 and 3, which are a portion of the compatible part, and two CCEs with CCE numbers 8 and 9, which are a portion of the compatible part, correspond to two CCEs with CCE numbers 14 and 15, which are a portion of the extension part, and two CCEs with CCE numbers 4 and 5, which are a portion of the compatible part, and two CCEs with CCE numbers 10 and 11, which are a portion of the compatible part, correspond to two CCEs with CCE numbers 16 and 17, which are a portion of the extension part.

Therefore, for example, in a case in which two CCEs with CCE numbers 12 and 13, which are a portion of the extension part, are used as the PDCCH, when two CCEs with CCE numbers 0 and 1, which are a portion of the compatible part, are used as the PDCCH region, the remaining allocated two CCEs with CCE numbers 6 and 7 are not used as the PDCCH region. That is, in practice, two CCES of the extension part correspond to two CCEs of the compatible part. Therefore, the control information transmission apparatus 100A can reduce the interference of the compatible part by a value corresponding to the CCEs which are not used in the compatible part since they overlap each other. This holds for a set of the CCEs with CCE numbers 14 and 15 and a set of the CCEs with CCE numbers 16 and 17.

Figure 15:
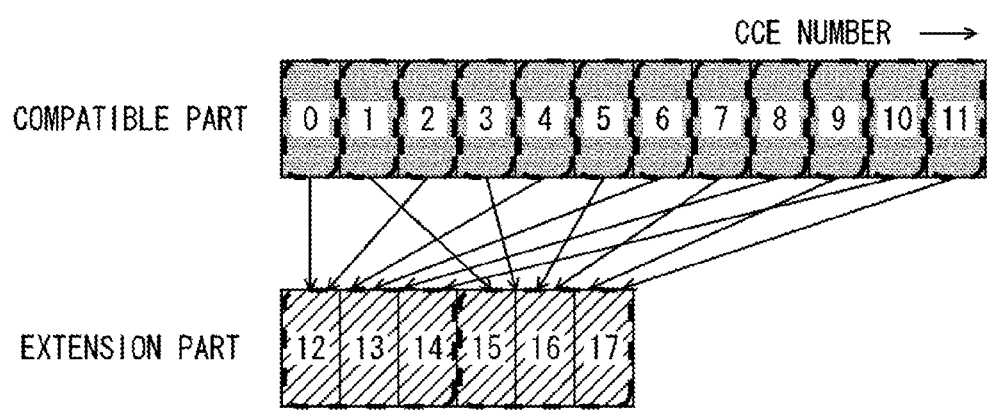
FIG. 15 is a diagram illustrating example (4) of PDCCH allocation.

FIG. 15 shows example (4) of PDCCH allocation. In the example shown in FIG. 15, CCE numbers 0 to 11 are given to the CCEs of the compatible part and CCE numbers 12 to 17 consecutive to CCE number 11 are given to the CCEs of the extension part. In the example shown in FIG. 15, six CCEs with CCE numbers 0, 2, 4, 6, 8, and 10, which are a portion of the compatible part, correspond to three CCEs with CCE numbers 12, 13 and 14, which are a portion of the extension part. Similarly, six CCEs with CCE numbers 1, 3, 5, 7, 9, and 11, which are a portion of the compatible part, correspond to three CCEs with CCE numbers 15, 16 and 17, which are a portion of the extension part.

Therefore, for example, in a case in which three CCEs with CCE numbers 12, 13, and 14, which are a portion of the extension part, are used as the PDCCH region, when one CCE with CCE number 0, which is a portion of the compatible part is used as the PDCCH region, the remaining allocated five CCEs with CCE numbers 2, 4, 6, 8, and 10 are not used as the PDCCH region. That is, in practice, three CCEs of the extension part correspond to one CCE of the compatible part. Therefore, the control information transmission apparatus 100A can reduce the interference of the compatible part by a value corresponding to the CCEs which are not used in the compatible part since they overlap each other. This holds for a set of the CCEs with CCE numbers 15, 16, and 17.

In the examples shown in FIGS. 12 to 15, transmission with the same resources as those of the CCEs which have been originally used in the compatible part has been described, but the invention is not limited thereto. The control information transmission apparatus 100A may perform transmission with resources less than those of the CCEs which have been originally used in the original compatible part, using that the PDCCH moved to the extension part does not interfere with signals from the HeNB, or even if there is interference therebetween, the interference is small. Therefore, the PDCCH may be transmitted with a small number of CCEs. Hereinafter, examples thereof will be described with reference to FIGS. 16 to 19.

Next, an example in which all resources including the extension part are three CCEs unlike the related art in which four CCEs are required as the PDCCH region in the compatible part will be described.

[Example (5) of PDCCH Allocation]

Figure 16:
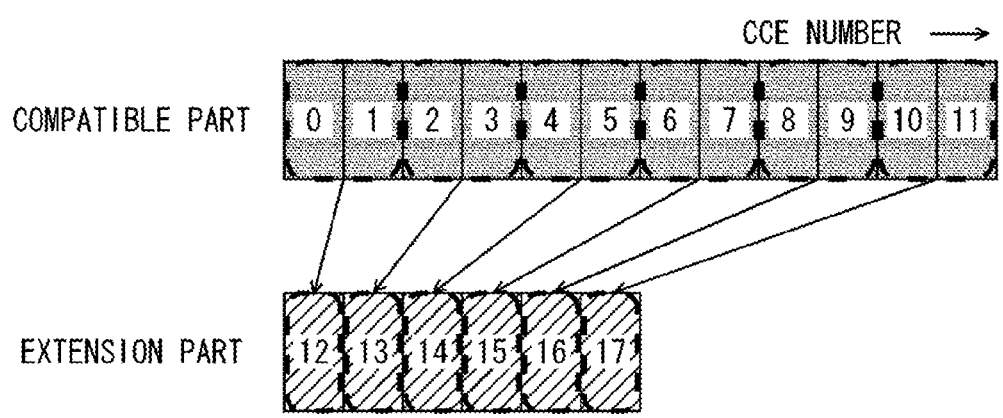
FIG. 16 is a diagram illustrating example (5) of PDCCH allocation.

FIG. 16 shows example (5) of PDCCH allocation. In the example shown in FIG. 16, CCE numbers 0 to 11 are given to the CCEs of the compatible part and CCE numbers 12 to 17 consecutive to the CCE number 11 are given to the CCEs of the extension part. In the example shown in FIG. 16, it is assumed that the PDCCH corresponding to two CCEs among four CCEs of the compatible part is moved to the compatible part.

As shown in FIG. 16, two CCEs with CCE numbers 0 and 1, which are a portion of the compatible part, correspond to one CCE with CCE number 12, which is a portion of the extension part. This holds for each of the CCEs with CCE numbers 12 to 17, which are a portion of the extension part. Therefore, for example, among four CCEs of the compatible part, the PDCCH corresponding to two CCEs other than two CCEs sent in the compatible part is sent to one CCE with CCE number 12, which is a portion of the extension part.

As described above, in the example shown in FIG. 16, among four CCEs of the compatible part, two CCEs are sent to the compatible part. Therefore, it is possible to easily obtain a frequency diversity effect in the compatible part. Thus, the example is suitable to obtain the frequency diversity effect. In addition, in the example shown in FIG. 16, the resources of four CCEs are needed in the compatible part, but the PDCCH is transmitted only with resources of three CCEs including the compatible part as a whole, using that the PDCCH moved to the extension part does not interfere with signals from the HeNB, or even if there is interference therebetween, the interference is small.

Figure 17:
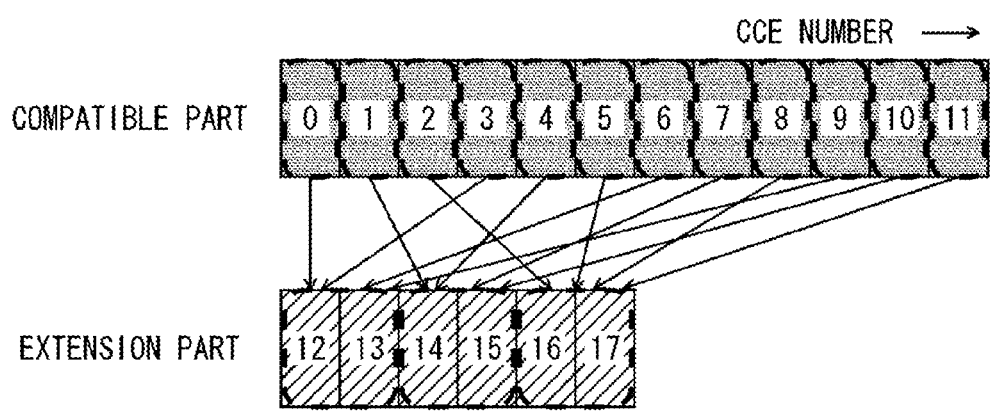
FIG. 17 is a diagram illustrating example (6) of PDCCH allocation.

FIG. 17 shows example (6) of PDCCH allocation. In the example shown in FIG. 17, CCE numbers 0 to 11 are given to the CCEs of the compatible part and CCE numbers 12 to 17 consecutive to the CCE number 11 are given to the CCEs of the extension part. In the example shown in FIG. 17, it is assumed that the PDCCH corresponding to one CCE among four CCEs of the compatible part is moved to the compatible part.

As shown in FIG. 17, one CCE with CCE number 0, which is a portion of the compatible part, corresponds to two CCEs with CCE numbers 12 and 13, which are a portion of the extension parts. This holds for a set of the CCEs with CCE numbers 14 and 15 and a set of the CCEs with CCE numbers 16 and 17, which are portions of the extension part. Therefore, for example, among four CCEs of the compatible part, the PDCCH corresponding to three CCEs other than one CCE sent in the compatible part is sent to two CCEs with CCE numbers 12 and 13, which are a portion of the extension part.

Therefore, in the example shown in FIG. 17, among four CCEs of the compatible, three CCEs are sent to the extension part in which interference is small. Therefore, the example is suitable to obtain a high interference resistance performance.

In some cases, when a given set of the CCEs is used, another set of the CCEs is not used due to sets of the CCEs causing an increase in the number of CCEs in the extension part even though the number of CCEs in the extension part is less than the number of CCEs in the compatible part. For example, the CCE with CCE number 0, which is a portion of the compatible part, is combined with the CCEs with CCE numbers 12 and 13, which are a portion of the extension part. However, when this combination is used, each of the CCEs with CCE numbers 3, 6, and 9, which are a portion of the compatible part and are defined to be combined with the CCE with CCE numbers 12 and 13 in the extension part similarly to the CCE with CCE number 0, is not used. Therefore, it is possible to effectively reduce the interference of the compatible part.

Next, an example in which the number of REs (physical resources) per CCE in the extension part is half that in the compatible part will be described.

[Example (7) of PDCCH Allocation]

Figure 18:
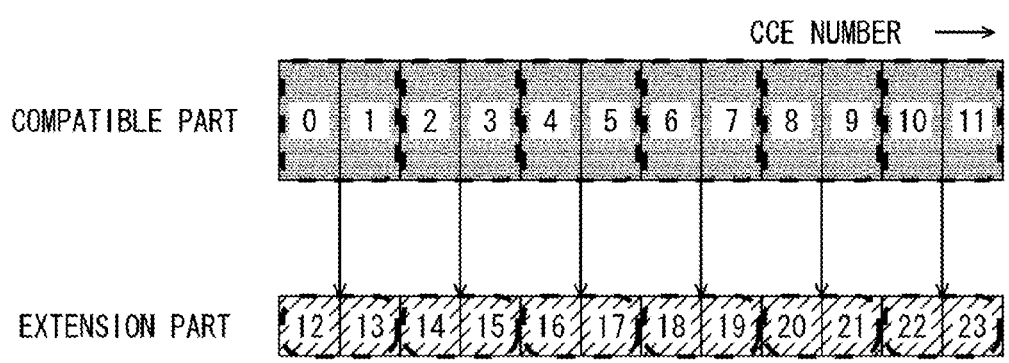
FIG. 18 is a diagram illustrating example (7) of PDCCH allocation.

FIG. 18 shows example (7) of PDCCH allocation. In the example shown in FIG. 18, CCE numbers 0 to 11 are given to the CCEs of the compatible part and CCE numbers 12 to 23 consecutive to CCE number 11 are given to the CCEs of the extension part. The number of REs per CCE in the compatible part is half the number of REs per CCE in the extension part.

In the example shown in FIG. 18, two CCEs with CCE numbers 0 and 1, which are a portion of the compatible part, correspond to two CCEs with CCE numbers 12 and 13. However, as described above, the number of REs per CCE in the compatible part is half the number of REs per CCE in the extension part. Therefore, resources corresponding to a total of three CCEs of the compatible part are used. This holds for a set of the CCEs with CCE numbers 14 and 15, a set of the CCEs with CCE numbers 16 and 17, a set of the CCEs with CCE numbers 18 and 19, a set of the CCEs with CCE numbers 20 and 21, and a set of the CCEs with CCE numbers 22 and 23, which are portions of the extension part.

Therefore, in the example shown in FIG. 18, similarly to the example shown in FIG. 16, among four CCEs of the compatible part, two CCEs are sent to the compatible part and it is easy to obtain a frequency diversity effect in the compatible part. Therefore, the example is suitable to obtain the frequency diversity effect.

[Example (8) of PDCCH Allocation]

Figure 19:
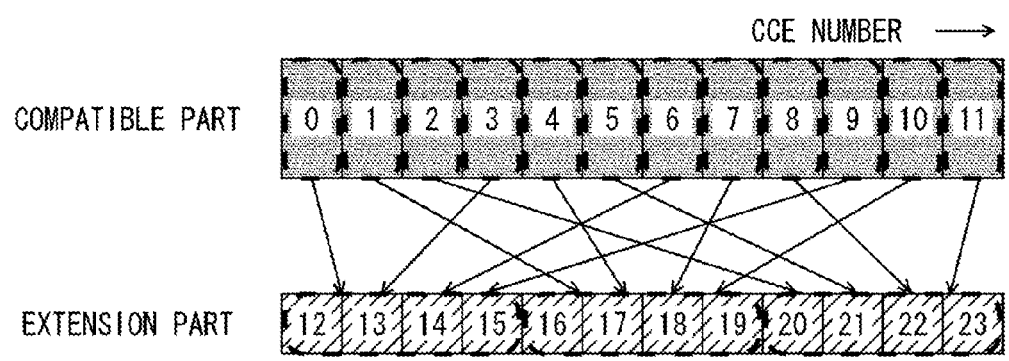
FIG. 19 is a diagram illustrating example (8) of PDCCH allocation.

FIG. 19 shows example (8) of PDCCH allocation. In the example shown in FIG. 19, CCE numbers 0 to 11 are given to the CCEs of the compatible part and CCE numbers 12 to 23 consecutive to CCE number 11 are given to the CCEs of the extension part. The number of REs per CCE in the compatible part is half the number of REs per CCE in the extension part.

As shown in FIG. 19, the CCEs with CCE numbers 0, 3, 6, and 9, which are a portion of the compatible part, correspond to the CCEs with CCE numbers 12 to 15, which are a portion of the extension part. This holds for a set of the CCEs with CCE numbers 16 to 19 and a set of the CCEs with CCE numbers 20 to 23, which are portions of the extension part. Therefore, for example, among four CCEs of the compatible part, the PDCCH corresponding to three CCEs other than one CCE sent from the compatible part is sent to two CCEs with CCE numbers 12 to 15, which are a portion of the extension part. Therefore, resources corresponding to a total of three CCEs of the compatible part are used.

Therefore, in the example shown in FIG. 19, among four CCEs of the compatible part, three CCEs are sent to the extension part in which interference is small. In the example shown in FIG. 19, similarly to the example shown in FIG. 17, when a given combination of the CCEs is used, some CCEs in the compatible part are not used. Therefore, it is possible to effectively reduce the interference of the compatible part.

As described above, in this modification, in the control information transmission apparatus 100A, the number of signals in the normal PDCCH region of the host apparatus (macro cell (Macro eNB)) is reduced. Therefore, it is possible to reduce interference from the PDCCH of the host apparatus (macro cell (Macro eNB)) to the PDCCH of the HeNB. Only the extension part is insufficient to widen the band width and is likely to be affected by frequency selectivity. However, since the control information transmission apparatus 100A uses the compatible part, it is possible to obtain a frequency diversity effect.

In this modification, in the control information transmission apparatus 100A, some or all of the signals in the PDCCH region of the compatible part are set to the PDCCH region of the extension part. For example, in the HetNet environment shown in FIG. 1, when the HeNB is not provided with the extension part and transmits a signal using only the compatible part (see FIG. 2B), the interference of the signals transmitted from the HeNB to the control information reception apparatus 200A with the extension part is reduced. Therefore, when control information required for communication is included in the PDCCH of the extension part in the control information transmission apparatus 100A, the control information reception apparatus 200A can reliably receive the PDCCH.

However, in the example shown in FIG. 14, for example, both a set of two CCEs with CCE numbers 0 and 1 and a set of two CCEs with CCE numbers 6 and 7, which are portions of the compatible part, are allocated to two CCEs with CCE numbers 12 and 13, which are a portion of the extension part. For example, when two CCEs with CCE numbers 12 and 13 are used in correspondence with two CCEs with CCE numbers 0 and 1, two CCEs with CCE numbers 6 and 7 are non-used resources. Therefore, it is possible to reduce the power density of the compatible part, but two CCEs with CCE numbers 6 and 7 cannot be used. As a result, the number of users capable of allocating the CCEs in the compatible part is reduced.

However, in the example shown in FIG. 16, only the CCE with CCE number 12, which is a portion of the extension part, is allocated to two CCEs with CCE numbers 0 and 1, which are a portion of the compatible part. Therefore, it is possible to reduce the amount of resources which are not used, as compared to the example shown in FIG. 14. Therefore, it is possible to increase the number of users capable of allocating the CCEs in the compatible part, as compared to the example shown in FIG. 14.

Therefore, in the example shown in FIG. 16, it is possible to obtain the frequency diversity effect and increase the number of users capable of allocating the CCEs in the compatible part, as compared to the example shown in FIG. 14.

Similarly, in the example shown in FIG. 15, for example, six CCEs with CCE numbers 0, 2, 4, 6, 8, and 10, which are a portion of the compatible part, are allocated to three CCEs with CCE numbers 12, 13, and 14, which are a portion of the extension part. For example, when three CCEs with CCE numbers 12, 13, and 14, which are a portion of the extension part, are used in correspondence with the CCE with CCE number 0, which is a portion of the compatible part, five CCEs with CCE numbers 2, 4, 6, 8, and 10, which are a portion of the compatible part, are non-used resources. Therefore, it is possible to reduce the power density of the compatible part and five CCEs with CCE numbers 2, 4, 6, 8, and 10, which are a portion of the compatible part, cannot be used. As a result, the number of users capable of allocating the CCEs in the compatible part is reduced.

However, in the example shown in FIG. 17, two CCEs with CCE numbers 12 and 13, which are a portion of the extension part, are allocated to four CCEs with CCE numbers 0, 3, 6, and 9, which are a portion of the compatible part. Therefore, it is possible to reduce the amount of resources which are not used, as compared to the example shown in FIG. 15. As a result, it is possible to increase the number of users capable of allocating the CCEs in the compatible part, as compared to the example shown in FIG. 15.

Therefore, in the example shown in FIG. 17, it is possible to obtain the frequency diversity effect and increase the number of users capable of allocating the CCEs in the compatible part, as compared to the example shown in FIG. 15.

(Second Modification)

Next, a control information transmission apparatus 100B and a control information reception apparatus 200B according to a second modification of the first embodiment will be described with reference to FIGS. 20 and 21.

In this modification, the control information transmission apparatus 100B logically incorporates a plurality of component carriers CC1 and CC2 into one CC and instructs the allocation of the resources of the compatible part and the extension part using only the PDCCH of the extension part. Therefore, the control information transmission apparatus 100B uses the extension part with small interference to transmit the PDCCH with a small amount of resource. When there are three or more CCs, the control information transmission apparatus 100B logically incorporates the extension parts laid across the compatible parts. In this way, it is possible to obtain frequency diversity, without using a compatible part.

In this modification, similarly to the first embodiment, the HetNet environment shown in FIG. 1 is assumed. Therefore, the signal transmitted from the HeNB to the HUE is likely to greatly interfere with the signal transmitted from the macro cell (Macro eNB) to the MUE.

The control information transmission apparatus 100B according to the first modification differs from the control information transmission apparatus 100 according to the first embodiment in the method in which the compatible part PDCCH generating unit 103 and the extension part PDCCH generating unit 112 allocate the PDCCH arranged in the resource block (RB) and is similar in operation to the control information transmission apparatus 100 according to the first embodiment except for that point. Therefore, the detailed description thereof will not be repeated.

Figure 20:
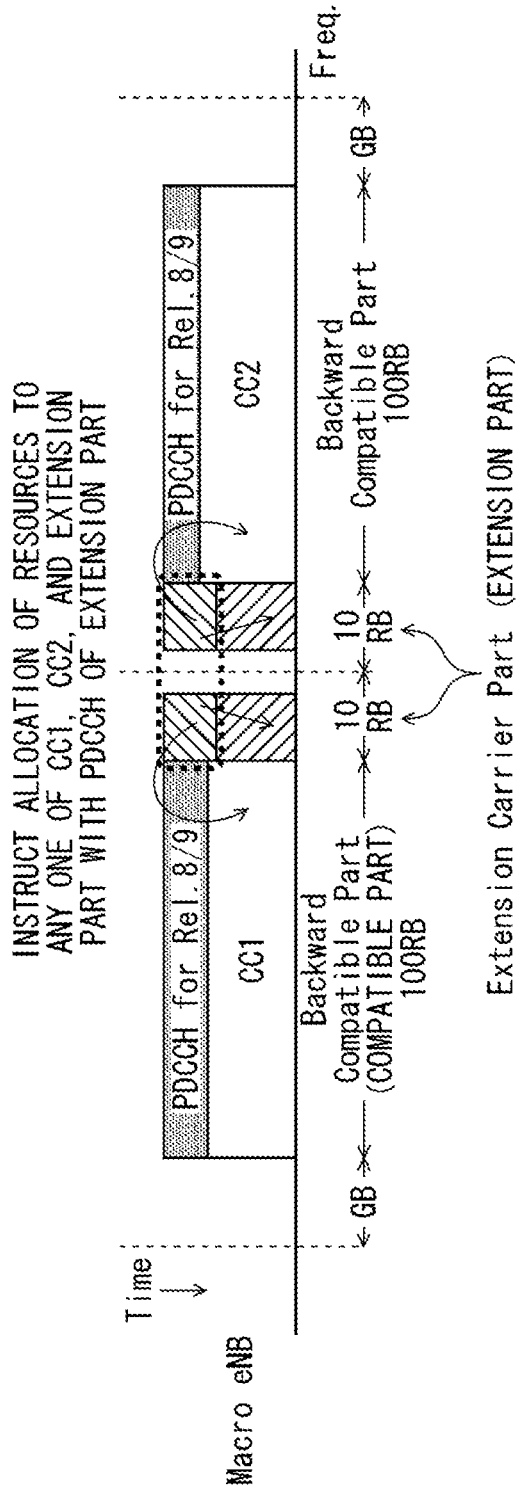
FIG. 20 is a diagram illustrating method (2) of allocating the PDCCH arranged in the resource block.

FIG. 20 is a diagram illustrating method (2) of allocating the PDCCH arranged in the resource block (RB). In FIG. 20, similarly to FIG. 24, the vertical axis indicates time and the horizontal axis indicates a frequency. In the drawings, in order to distinguish a plurality of component carriers (CCs), the component carriers are represented by CC1 and CC2, and an extension carrier or a carrier segment is simply represented as an extension carrier part. In the drawings, RB (Resource Block) is a resource unit including 12 sub-carriers of one sub-frame in LTE or LTE-A. In the drawings, each CC is a sub-frame unit. A backward compatible part is 100 RBs and the extension carrier part (extension part) is 10 RBs for each CC.

The compatible part is a system band used by a plurality of systems which need to retain compatibility and the extension part is a frequency resource which is provided in a frequency band adjacent to the compatible part and is capable of allocating a transmission signal.

That is, in this modification, similarly to the embodiment, the system band used by a plurality of systems which need to retain compatibility is a component carrier which is used in both LTE and LTE-Advanced. The frequency resource which is provided in the frequency band adjacent to the compatible part and is capable of allocating the transmission signal is an extension carrier or a carrier segment.

As shown in FIG. 20, when the control information transmission apparatus 100B logically incorporates two extension parts between two component carriers CC1 and CC2 into one CC, the allocation of the resources of any one of the two component carriers CC1 and CC2 is instructed by the PDCCH of the extension part. The control information transmission apparatus 100B can use the extension part with small interference, thereby transmitting the PDCCH with a small amount of resources.

Figure 21:
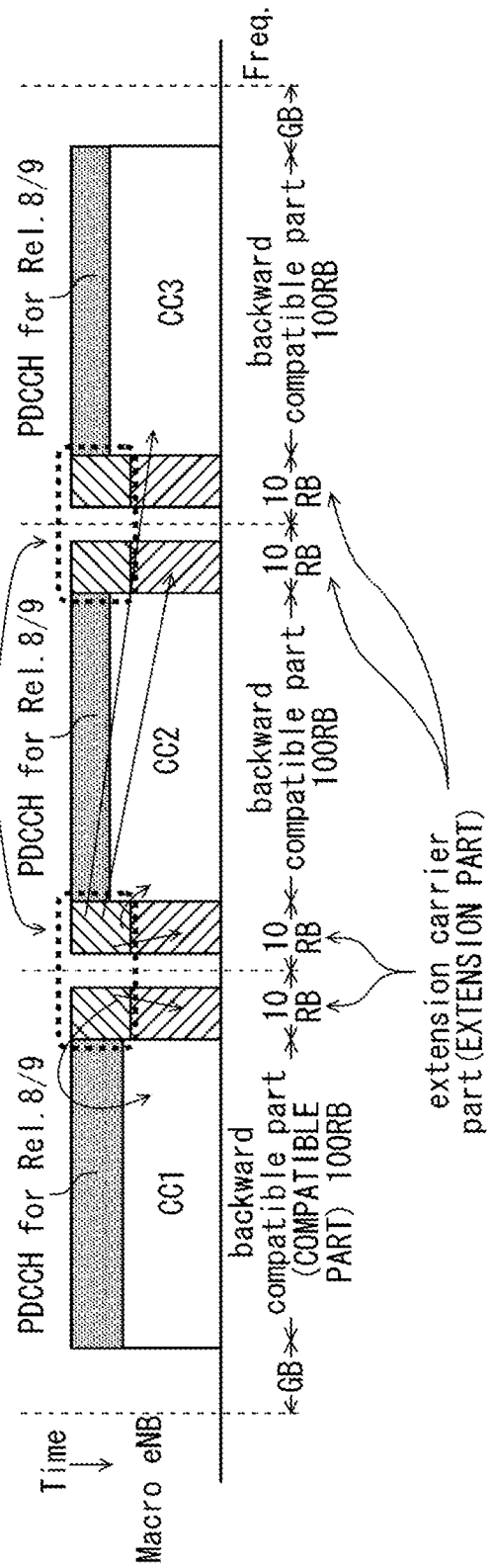
FIG. 21 is a diagram illustrating example (3) of the method of allocating the PDCCH arranged in the resource block.
Figure 23:
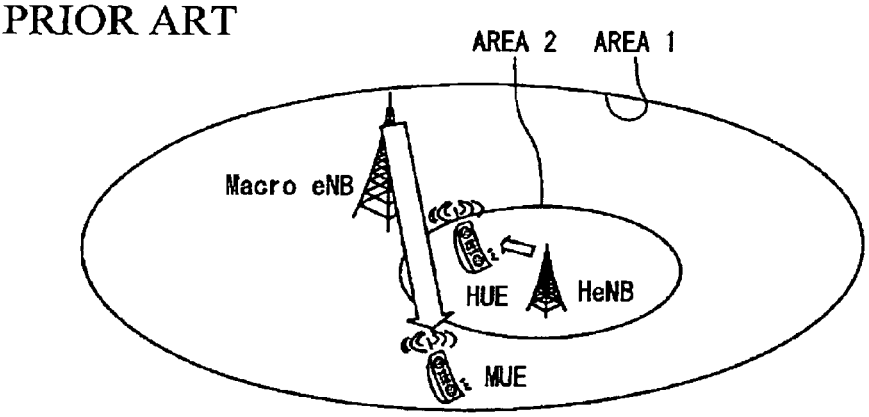
FIG. 23 is a diagram illustrating an example of a HetNet.

FIG. 21 is a diagram illustrating a method (3) of allocating the PDCCH arranged in the resource block (RB). In FIG. 21, similarly to FIG. 24, the vertical axis indicates time and the horizontal axis indicates a frequency. In the drawings, in order to distinguish a plurality of component carriers (CCs), the component carriers are represented by CC1, CC2, and CC3 and an extension carrier or a carrier segment is simply represented as an extension carrier part. In the drawings, the RB (Resource Block) is a resource unit including 12 sub-carriers of one sub-frame in LTE or LTE-A. In the drawings, each CC is a sub-frame unit. A backward compatible part is 100 RBs and the extension carrier part (extension part) is 10 RBs for each CC.

As shown in FIG. 21, the control information transmission apparatus 100B logically incorporates four extension parts between CC1 and CC2 and between CC2 and CC3. In this way, it is possible to obtain frequency diversity without using a compatible part. As such, when there are three or more CCs, the extension parts (in FIG. 21, the extension parts between CC1 and CC2 and between CC2 and CC3) laid across the compatible parts are logically incorporated. In this way, the control information transmission apparatus 100B can obtain frequency diversity, without using a compatible part.

As described above, in this modification, in the control information transmission apparatus 100B, the number of signals in the PDCCH region of the compatible part of the host apparatus (macro cell (Macro eNB)) is reduced. Therefore, it is possible to reduce interference from the PDCCH of the host apparatus (macro cell (Macro eNB)) to the PDCCH of the HUE connected to the HeNB. In addition, in the control information transmission apparatus 100B, the interference of the PDCCH of the host apparatus (macro cell (Macro eNB)) moved to the extension part is small. Since it is expected that the extension part will receive small interference from the outside, the control information transmission apparatus 100B can transmit the PDCCH with the extension part, using less resources than those in the compatible part. Therefore, it is possible to effectively reduce the power density of the compatible part. When there are three or more CCs, the control information transmission apparatus 100B logically incorporates the extension parts laid across the compatible parts. In this way, it is possible to obtain frequency diversity, without using a compatible part.

In the above-described embodiment and each modification, even in an environment in which the PDCCH reception quality of the terminal (MUE) in the macro cell (Macro eNB) which is arranged in the vicinity of the femtocell is low, it is possible to obtain the same effect. In addition, interference is reduced by a value corresponding to the PDCCH moved to the extension part. Therefore, for a portion remaining in the compatible part, a terminal-oriented PDCCH after Rel.10 is moved to the extension part and some of the empty CCEs are used. In this way, interference resistance is improved.

In the above-described embodiment and each modification, the extension part may be a carrier segment instead of an extension carrier. In addition, the extension carrier may be treated as a separate CC and the carrier segment may be treated as resources associated with CC, considering consistency with the standard. In addition, the extension part is not necessarily the band interposed between a plurality of CCs, but may be adjacent to the individual CC.

In the above-described embodiment and each modification, when the extension carrier or the carrier segment is used in the HeNB, the HeNB may use the extension part. When the HeNB uses the extension part, interference from the HeNB to the PDCCH of the compatible part of the macro cell (Macro eNB) is also reduced.

In the above-described embodiment and each modification, the PDCCH for an LTE-A terminal (UE) after Rel.10 may be certainly moved to the extension part, or it may be used separately from allocation in the compatible part, according to the number of terminals (UEs) connected.

In the above-described embodiment and each modification, even when the HeNB is a picocell macro or a relay node, the same effect as described above is obtained. In this case, the above-described embodiment and each modification may be used in a homogeneous network environment including only a macro, not in the HetNet environment shown in FIG. 1.

In the above-described embodiment and each modification, when the HeNB corresponds to only the LTE-A terminal (UE) after Rel.10, the PDCCH for the terminal (UE) connected to the HeNB may be transmitted with RBs increased in the extension carrier.

In the above-described embodiment and each modification, when the HeNB uses the extension part, the HUE may use the extension part as much as possible. In this case, the terminal (UE) connected to the macro cell (Macro eNB) determines priority in the use of the extension CCE on the basis of the type of base station connected. In this case, the macro cell (Macro eNB) explicitly notifies the terminal (UE) connected to the macro cell (Macro eNB) of priority in the use of the extension CCE.

In the above-described embodiment and each modification, the antenna has been described. However, the invention can also be applied to an antenna port. The antenna port (antenna port) indicates a logical antenna including one or a plurality of physical antennas. That is, the antenna port does not necessarily indicate one physical antenna, but may indicate, for example, an array antenna including a plurality of antennas. For example, in LTE, the number of physical antennas forming the antenna port is not prescribed, and the antenna port is prescribed as a minimum unit in which the base station can transmit different reference signals. In some cases, the antenna port is prescribed as a minimum unit which multiplies the weighting of a pre-coding vector.

Each functional block used to describe the embodiment and each modification is typically implemented by an LSI, which is an integrated circuit. Each functional block may be integrated into one chip, or a portion of or the entire functional block may be integrated into one chip. Here, the LSI is used as the integrated circuit, but the integrated circuit may be called an IC, a system LSI, a super LSI, or an ultra LSI according to the degree of integration.

In addition, a circuit integration method is not limited to LSI, but circuit integration may be implemented by a dedicated circuit or a general-purpose processor. After the LSI circuit is manufactured, a programmable FPGA (Field Programmable Gate Array) or a reconfigurable processor capable of reconfiguring the connection of circuit cells in the LSI circuit or the setting thereof may be used.

When a circuit integration technique capable of replacing LSI appears with the progress of semiconductor technology or other technologies derived from the semiconductor technology, the technique may be used to integrate the functional blocks. For example, biotechnology can be applied.

Although the present invention has been described in detail and with reference to specific embodiments, diverse modifications or corrections may be made by those of skilled in the art without departing from the spirit and scope of the present invention.

This application is based on Japanese Patent Application (Japanese Patent Application No. 2010-017113) filed on Jan. 28, 2010, the disclosure of which is incorporated herein by reference in its entirety.

INDUSTRIAL APPLICABILITY

The control information transmission apparatus and the control information transmission method according to the invention can reduce the interference power of the control signal of the terminal connected to the femtocell, and thus are useful as, for example, a wireless communication apparatus.

The control information reception apparatus according to the invention can reliably receive the control signal transmitted to the host apparatus and thus is useful as, for example, a wireless communication apparatus.

REFERENCE SIGNS LIST

100: CONTROL INFORMATION TRANSMISSION APPARATUS
101: SETTING UNIT
102: CONTROL UNIT
103: COMPATIBLE PART PDCCH GENERATING UNIT
104, 105, 106, 113, 209: MODULATION UNIT
107: ARRANGEMENT UNIT
108: IFFT UNIT
109: CP ADDING UNIT
110: TRANSMISSION RF UNIT
111, 201: ANTENNA
112: EXTENSION PART PDCCH GENERATING UNIT
202: RECEPTION RF UNIT
203: CP REMOVING UNIT
204: FFT UNIT
205: DEMULTIPLEXING UNIT
206: SET INFORMATION RECEIVING UNIT
207: COMPATIBLE PART PDCCH RECEIVING UNIT
208: PDSCH RECEIVING UNIT
210: DFT UNIT
211: ARRANGEMENT UNIT
212: IFFT UNIT
213: CP ADDING UNIT
214: TRANSMISSION RF UNIT
215: EXTENSION PART PDCCH RECEIVING UNIT

The invention claimed is:

1. A control information transmission apparatus comprising:
an arrangement circuit that arranges control signals for a terminal in resources of a control region of a compatible part and in resources of a control region of an extension part, wherein the control signals are for the terminal in the extension part and the control signals are physical downlink control channels (PDCCH), and a component carrier comprises the compatible part and the extension part, the compatible part and the extension part each comprising a control region; and
a transmitter that transmits the arranged control signals for the terminal,
wherein the arrangement circuit arranges the control signals for the terminal in the extension part and the compatible part among the resources,
the extension part is provided in a frequency band adjacent to the compatible part,
the arrangement circuit forms predetermined units of the resources for the control signals and defines numbers which are consecutive from the compatible part to the extension part and are allocated to the predetermined units of the resources,
the arrangement circuit makes a plurality of units of the predetermined units of the compatible part correspond to one unit or a plurality of units of the predetermined units of the extension part on the basis of the numbers, and
when the control signals for the terminal are arranged in one unit or a plurality of units among the plurality of units of the predetermined units of the compatible part and one unit or a plurality of units of the predetermined units of the extension part, the control signals for the terminal are not arranged in the other units among the plurality of units of the predetermined units of the compatible part,
the predetermined units of the resources for the control signal is a Control Channel Element (CCE), and
the numbers which are consecutive from the compatible part to the extension part and are allocated to the predetermined units of the resources are CCE numbers.

2. The control information transmission apparatus according to claim 1,
wherein the compatible part is a system band used by a plurality of systems which need to retain compatibility, and
the extension part is a frequency resource that is provided in a frequency band adjacent to the compatible part and is capable of allocating a transmission signal.

3. A control information transmission apparatus comprising:
an arrangement circuit that arranges control signals for a terminal in resources of a control region of a compatible part and in resources of a control region of an extension part, wherein the control signals are for the terminal in the extension part and the control signals are physical downlink control channels (PDCCH), and a component carrier comprises the compatible part and the extension part, the compatible part and the extension part each comprising a control region; and a transmitter that transmits the arranged control signals for the terminal, wherein the arrangement circuit arranges all of the control signals for the terminal in an extension part obtained by logically integrating a plurality of extension parts, the extension part is provided in a frequency band adjacent to the compatible part, the arrangement circuit forms predetermined units of the resources for the control signals and defines numbers which are consecutive from the compatible part to the extension part and are allocated to the predetermined units of the resources, the arrangement circuit makes a plurality of units of the predetermined units of the compatible part correspond to one unit or a plurality of units of the predetermined units of the extension part on the basis of the numbers, when the control signals for the terminal are arranged in one unit or a plurality of units among the plurality of units of the predetermined units of the compatible part and one unit or a plurality of units of the predetermined units of the extension part, the control signals for the terminal are not arranged in the other units among the plurality of units of the predetermined units of the compatible part, the predetermined units of the resources for the control signal is a Control Channel Element (CCE), and the numbers which are consecutive from the compatible part to the extension part and are allocated to the predetermined units of the resources are CCE numbers.

4. The control information transmission apparatus according to claim 3, wherein the arrangement circuit arranges all of the control signals for the terminal in an extension part obtained by logically integrating a plurality of extension parts laid across the compatible part, among the plurality of extension parts.

5. The control information transmission apparatus according to claim 3, wherein the compatible part is a system band used by a plurality of systems which need to retain compatibility, and the extension part is a frequency resource that is provided in a frequency band adjacent to the compatible part and is capable of allocating a transmission signal.

6. A control information transmission method comprising:

arranging control signals for a terminal in resources of a control region of a compatible part and in resources of a control region of an extension part, wherein the control signals are for the terminal in the extension part and the control signals are physical downlink control channels (PDCCH), and a component carrier comprises the compatible part and the extension part, the compatible part and the extension part each comprising a control region; and transmitting the arranged control signals for the terminal, forming predetermined units of the resources for the control signals and defining numbers which are consecutive from the compatible part to the extension part and are allocated to the predetermined units of the resources, and making a plurality of units of the predetermined units of the compatible part correspond to one unit or a plurality of units of the predetermined units of the extension part on the basis of the numbers, wherein the arranging step arranges the control signals for the terminal in the extension part and the compatible part among the resources, the extension part is provided in a frequency band adjacent to the compatible part, when the control signals for the terminal are arranged in one unit or a plurality of units among the plurality of units of the predetermined units of the compatible part and one unit or a plurality of units of the predetermined units of the extension part, the control signals for the terminal are not arranged in the other units among the plurality of units of the predetermined units of the compatible part, the predetermined units of the resources for the control signal is a Control Channel Element (CCE), and the numbers which are consecutive from the compatible part to the extension part and are allocated to the predetermined units of the resources are CCE numbers.

7. The control information transmission method according to claim 6, wherein the compatible part is a system band used by a plurality of systems which need to retain compatibility, and the extension part is a frequency resource that is provided in a frequency band adjacent to the compatible part and is capable of allocating a transmission signal.

8. The control information transmission method according to claim 6, wherein the arranging step arranges all of the control signals for the terminal in an extension part obtained by logically integrating a plurality of extension parts.

9. The control information transmission method according to claim 8, wherein the arranging step arranges all of the control signals for the terminal in an extension part obtained by logically integrating a plurality of extension parts laid across the compatible part, among the plurality of extension parts.

* * * * *